(12) United States Patent
Tain et al.

(10) Patent No.: US 7,243,327 B1
(45) Date of Patent: Jul. 10, 2007

(54) METHOD FOR AUTOMATICALLY ROUTING CONNECTIONS BETWEEN TOP SIDE CONDUCTORS AND BOTTOM SIDE CONDUCTORS OF AN INTEGRATED CIRCUIT PACKAGE

(75) Inventors: Alex Tain, Milpitas, CA (US); Eric Tosaya, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 50 days.

(21) Appl. No.: 11/136,036

(22) Filed: May 23, 2005

Related U.S. Application Data

(63) Continuation of application No. 10/118,460, filed on Apr. 5, 2002, now Pat. No. 6,976,236.

(51) Int. Cl.
*G06F 17/50* (2006.01)

(52) U.S. Cl. ......................................... 716/12

(58) Field of Classification Search .................. 716/12, 716/14, 15; 257/777, 778; 438/100, 108, 438/637, 639
See application file for complete search history.

(56) References Cited

U.S. PATENT DOCUMENTS

| | | | |
|---|---|---|---|
| 5,068,603 A | 11/1991 | Mahoney |
| 5,544,017 A | 8/1996 | Beilin et al. |
| 5,894,165 A | 4/1999 | Ma et al. |
| 5,974,662 A | 11/1999 | Eldrige et al. |
| 5,990,547 A | 11/1999 | Sharma et al. |
| 6,041,269 A | 3/2000 | Tain et al. |
| 6,137,168 A | 10/2000 | Kirkman |
| 6,229,227 B1 | 5/2001 | Muthukumaraswamy et al. |
| 6,246,247 B1 | 6/2001 | Eldridge et al. |
| 6,271,598 B1 | 8/2001 | Vindasius et al. |
| 6,319,752 B1 | 11/2001 | Tain et al. |
| 6,399,422 B1 | 6/2002 | Tomita et al. |
| 6,479,319 B1 | 11/2002 | Mora et al. |
| 6,496,886 B1 | 12/2002 | Osaka et al. |
| 6,510,539 B1 | 1/2003 | Deemie et al. |
| 6,521,530 B2 | 2/2003 | Peters et al. |
| 6,534,879 B2 | 3/2003 | Terui |
| 6,569,694 B1 | 5/2003 | Sarma et al. |
| 6,584,596 B2 | 6/2003 | Buffet et al. |
| 6,642,080 B1 | 11/2003 | Ference et al. |
| 6,665,194 B1 | 12/2003 | Patel et al. |
| 6,680,219 B2 | 1/2004 | Reyes et al. |
| 6,680,544 B2 | 1/2004 | Lu et al. |
| 6,686,666 B2 | 2/2004 | Bodas |

*Primary Examiner*—Paul Dinh
(74) *Attorney, Agent, or Firm*—Schwegman, Lundberg, Woessner & Kluth P.A.

(57) ABSTRACT

A method of routing connections of an integrated circuit package having a set of top side conductors and bottom side conductors. The method includes defining at least one distribution layer within the package, and positioning a set of upper vias between the set of top side conductors and the distribution layer. A set of lower vias is positioned between the distribution layer and the set of bottom side conductors that correspond to the set of top side conductors. One or more connections on the distribution layer are routed between the set of upper vias and the set of lower vias. In this manner, the one or more top side conductors are coupled automatically with their respective one or more bottom side conductors. This process may be implemented using one or more computer modules or computer operations.

13 Claims, 33 Drawing Sheets

```
(NETLIST)
$PACKAGES
C4_PAD ! C4_PAD ; C4_PAD
U01 ! U01 ; U01
$NETS
ANALOG_DIODE_N ; C4_PAD.D54 U01.A22
ANALOG_DIODE_P ; C4_PAD.D55 U01.B22
VSS ; C4_PAD.DL52 U01.AU20
CLK_OBS_LVDS_10 ; C4_PAD.DJ87 U01.AT40
CLK_OBS_LVDS_11 ; C4_PAD.DJ88 U01.AR40
CLK_OBS_LVDS_12 ; C4_PAD.DJ89 U01.AP40
$A_PROPERTIES
DIFFERENTIAL_PAIR DIFFPAIR1 ; ANALOG_DIODE_N ANALOG_DIODE_P
$END
```
154

METHOD FOR AUTOMATICALLY ROUTING CONNECTIONS BETWEEN TOP SIDE CONDUCTORS AND BOTTOM SIDE CONDUCTORS OF AN INTEGRATED CIRCUIT PACKAGE

CROSS-REFERENCE TO RELATED APPLICATIONS

This application claims priority to and is a continuation application of U.S. patent application Ser. No. 10/118,460 filed Apr. 5, 2002 now U.S. Pat. No. 6,976,236, entitled "METHOD FOR AUTOMATICALLY ROUTING CONNECTIONS BETWEEN TOP SIDE CONDUCTORS AND BOTTOM SIDE CONDUCTORS OF AN INTEGRATED CIRCUIT PACKAGE," which is hereby incorporated by reference in its entirety.

FIELD OF THE INVENTION

This invention relates, in general, to automatically routing connections between top and bottom side conductors of an integrated circuit package.

BACKGROUND OF THE INVENTION

In the design of packaging for integrated circuits (ICs), a die (having an integrated circuit thereon) is electrically and physically connected to a package. The package has top side conductors, a body portion, and bottom side conductors.

FIG. 1 shows an example of a die 20 and a package 22, wherein the die is a "flip chip" with an interconnect medium 24 (i.e., solder bumps, balls, posts, etc.) thereon, and the package has top side conductors 26, such as pads, for electrical connection to the die, and bottom side conductors 28 for electrical connection with a printed circuit board (PCB), an IC socket, or the like. The bottom side conductors 28 can be in the form of, for example, metallized pads, pins, balls, or columns which are to connect the package to the PCB or IC socket. The bottom side conductors 28 can be integral to the package, or can be provided by or assembled using a solder column or balls.

The body of the package 22 provides, among other things, routing of the top side conductors 26 to the bottom side conductors 28. In complex IC designs, the die 20 may have thousands of interconnect sites (i.e., solder bumps) thereon, while the package 22 accordingly has thousands of top side conductors 26 and bottom side conductors 28. Further, the package 22 may be comprised of multiple layers (i.e., twenty or more) of ground planes, power planes, or signal distribution layers, which are used to route the connections between the top side conductors to the bottom side conductors.

As recognized by the present inventors, it can be very difficult and time consuming to design the logical and physical connections between the top side conductors 26 to the bottom side conductors 28, particularly where relationships such as electrical and physical constraints between the groups of signals lines need to be maintained throughout the package, as with the case of very high frequency signal lines. Such logical connections are conventionally designed by a package engineer using manual data entry to manually connect each top side conductor to each bottom side conductor—such as by manually "pointing and clicking" between two conductors within a software design tool. While commercially available design tools can automatically assign these connections, such tools have severe limitations in their ability to follow the required electrical and physical design constraints.

As recognized by the present inventors, what is needed is a method for automatically routing the connections between top side conductors and bottom side conductors of an IC package, while maintaining the relative relationships between groups of signal lines as needed.

It is against this background that various embodiments of the present invention were developed.

SUMMARY OF THE INVENTION

In light of the above and according to one broad aspect of one embodiment of the present invention, disclosed herein is a method of routing connections in an integrated circuit package having a set of top side conductors and bottom side conductors. The method includes defining at least one distribution layer within the package, and positioning a set of upper vias between the set of top side conductors and the distribution layer. A set of lower vias is positioned between the distribution layer and the set of bottom side conductors that correspond to the set of top side conductors. One or more connections on the distribution layer are routed between the set of upper vias and the set of lower vias. In this manner, the one or more top side conductors are coupled with their respective one or more bottom side conductors. This process may be implemented using one or more computer modules or computer operations.

The method may include, in one embodiment, specifying one or more design constraints, wherein the routing operation is based on the one or more design constraints. In this manner, the top side conductors of an integrated circuit package are automatically routed to the corresponding bottom side conductors of the integrated circuit package while respecting the specified design constraints and/or rules. Such design constraints may include maintaining a spatial relationship between at least one pair of differential signals. Further, in one example, a user interface is provided to define a region on the distribution layer where the routing operation may occur. This region may be defined using "keep-in" and "keep-out" boundaries, described below. In one embodiment, the set of the top side conductors may be defined concentrically as a ring containing a single row of top side conductors along each side of the package, and the ring may be used to define the keep-out boundary.

In another embodiment, disclosed herein is a method of routing connections between a plurality of top side conductors on a top conductor layer of an integrated circuit package with a plurality of bottom side conductors on a bottom conductor layer of the integrated circuit package. A file is read which specifies a set of logical connections between a plurality of top side conductors and bottom side conductors, and at least two redistribution layers are defined within the package, wherein a first redistribution layer is provided to route a first set of top side conductors and a second redistribution layer is provided to route a second set of top side conductors. For the first set of top side conductors, one or more upper vias from the top side conductors of the top conductor layer are connected with the first redistribution layer, and one or more lower vias from the bottom side conductors of the bottom conductor layer are connected with the first redistribution layer. On the first redistribution layer, one or more connections are routed between the upper vias and the lower vias for the first set of top side conductors, thereby connecting the first set of top side conductors with their respective bottom side conductors.

Further, the method may include, for the second set of top side conductors, connecting one or more upper vias from the top side conductors of the top conductor layer with the second redistribution layer, and connecting one or more lower vias from the bottom side conductors of the bottom conductor layer with the second redistribution layer. On the second redistribution layer one or more connections are routed between the upper vias and the lower vias for the second set of top side conductors, thereby connecting the second set of top side conductors with their respective bottom side conductors.

According to another broad aspect of another embodiment of the present invention, disclosed herein is a method for automatically placing vias in an integrated circuit package having a plurality of top side conductors and a plurality of bottom side conductors. In one example, the method includes reading a file specifying a set of logical connections between a plurality of top side conductors and bottom side conductors. At least two redistribution layers are defined within the package, wherein a first redistribution layer is provided to route connections with a first set of top side conductors, and a second redistribution layer is provided to route connections with a second set of top side conductors. A set of upper vias is positioned between the first set of top side conductors and the first redistribution layer, and a set of lower vias is positioned between the first redistribution layer and a set of bottom side conductors that correspond to the first set of top side conductors.

The method may also include positioning a set of upper vias between the second set of top side conductors and the second redistribution layer, positioning a set of lower vias between the second redistribution layer and a set of bottom side conductors that correspond to the second set of top side conductors.

According to another broad aspect of another embodiment of the present invention, disclosed herein is a method for automatically routing connections between a set of top side conductors and bottom side conductors of an integrated circuit package. In one embodiment, the method includes reading a file specifying a set of logical connections between a plurality of top side conductors and bottom side conductors. At least two redistribution layers are defined within the package, wherein a first redistribution layer is provided to route connections with a first set of top side conductors, and a second redistribution layer is provided to route connections with a second set of top side conductors. A set of upper vias is positioned between the first set of top side conductors and the first redistribution layer, and a set of lower vias is positioned between the first redistribution layer and a set of bottom side conductors that correspond to the first set of top side conductors. On the first redistribution layer, one or more connections between the first set of upper vias and the first set of lower vias are connected, thereby connecting one or more top side conductors to their respective one or more bottom side conductors.

Various embodiments of the present invention may be embodied as a computer program product including a computer usable medium and computer readable code embodied on said computer usable medium, the computer readable code including computer readable program code devices configured to cause the computer to perform or effect one or more of the operations described herein.

Other features, utilities and advantages of the various embodiments of the invention will be apparent from the following more particular description of embodiments of the invention as illustrated in the accompanying drawings.

DETAILED DESCRIPTION

Figure 1:
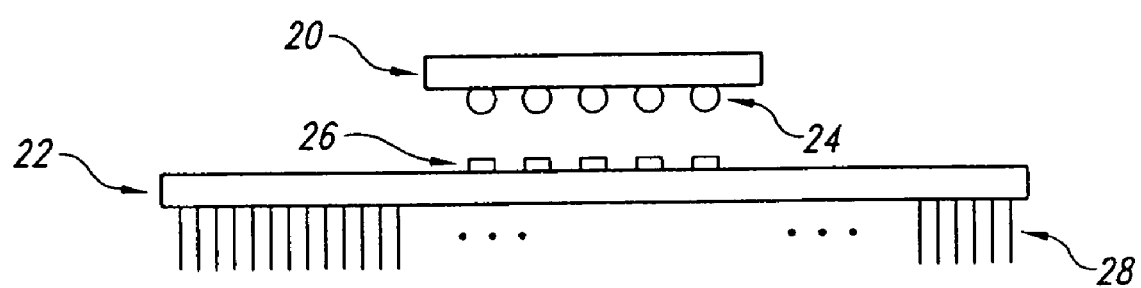
FIG. 1 illustrates a die and a package of an integrated circuit.

Disclosed herein is a method and computer program product for automatically routing within a package 22 of an integrated circuits the connections between the top side conductors 26 and the bottom side conductors 28. An example of an integrated circuit package 22 is shown in FIG. 1. In accordance with embodiments of the present invention, the top side conductors are automatically connected with bottom side conductors within the one or more layers of the package while preserving the relative relationships specified by a user as to how sets or groups of signal lines should be positioned relative to one another.

As used herein, the term "bottom side conductors" or "pins" 28 refers to the conductors on the package 22 that are positioned to be connected with the printed circuit board or with an IC socket. Bottom side conductors include but are not limited to, for example, metallized pads, pins, balls, or columns, or the like, and these terms are used interchangeably herein to generally refer to a bottom side conductor.

As used herein, the term "top side conductors" or "pads" 26 refers to the conductors on the package 22 that are positioned to be connected with the conductors of the die. Top side conductors include but are not limited to, for example, pads that are adapted to be electrically connected with a corresponding conductor of the die—such as a flip chip (FC) solder ball.

The term "logical connection" refers to a representation of a physical connection between two conductors. In one example, a logical connection between a particular top side conductor and a particular bottom side conductor indicates that a physical or electrical connection between the two conductors should be made within the package.

Figure 2:
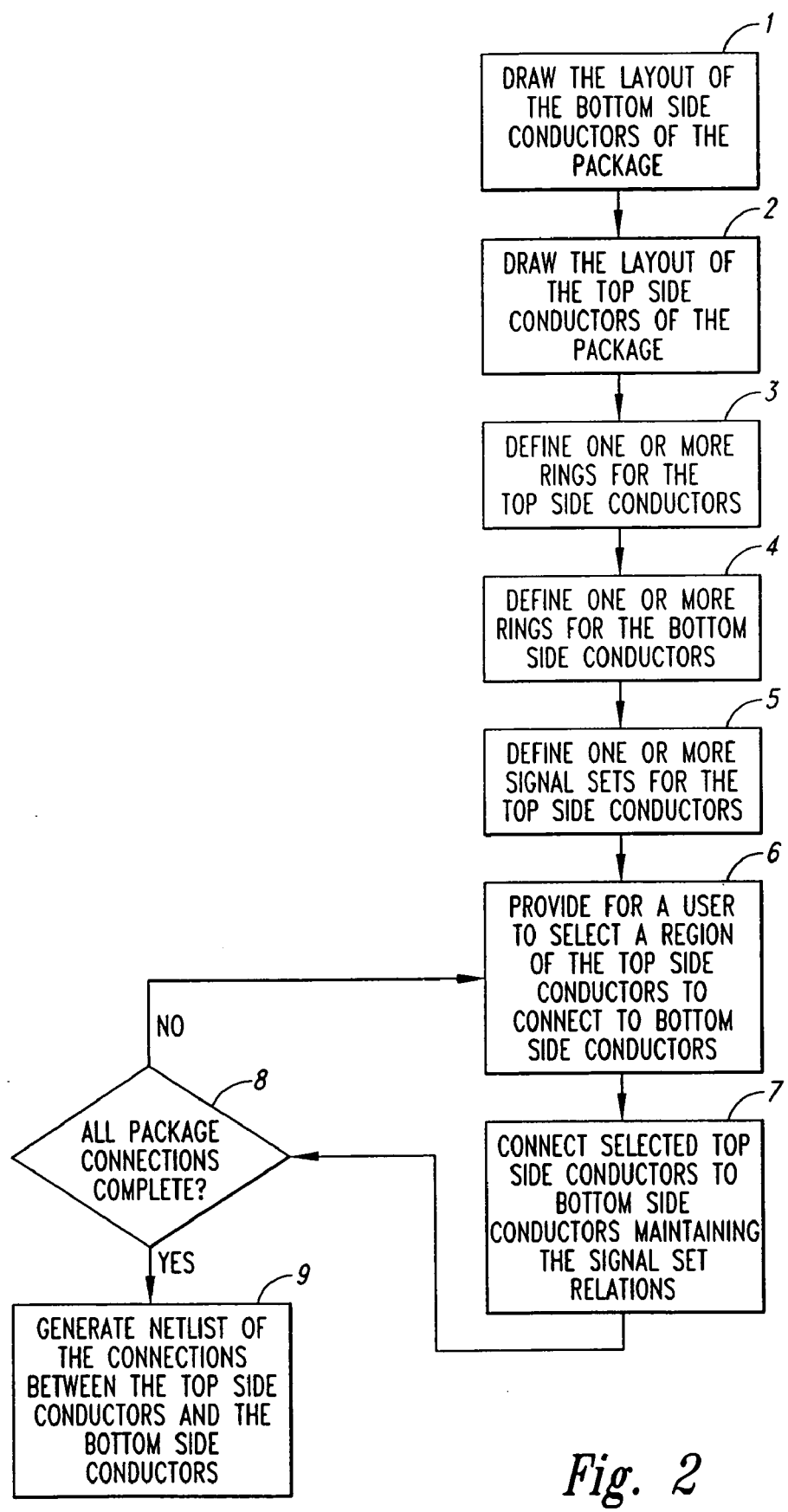
FIG. 2 illustrates the logical operations for automatically connecting top side conductors to bottom side conductors of an integrated circuit package, in accordance with one embodiment of the present invention.

Referring now to FIG. 2, one example of the logical operations for automatically connecting top side conductors 26 to bottom side conductors 28 of an integrated circuit package 22 is shown. At operation 1, the layout of the bottom side conductors of the package is created, based on various inputs describing the package, as will be discussed with reference to FIGS. 3–4. The layout of the bottom side conductors is drawn and displayed in a graphical user interface (GUI), so that a user can see and manipulate the image of the bottom side conductors of the package.

At operation 2, the layout of the top side conductors of the package is created, based on various inputs describing package and the footprint of the die, as will be discussed with reference to FIGS. 5–6. The layout of the top side conductors is drawn and displayed in a GUI, so that a user can see and manipulate the image of the top side conductors of the package.

Figure 3:
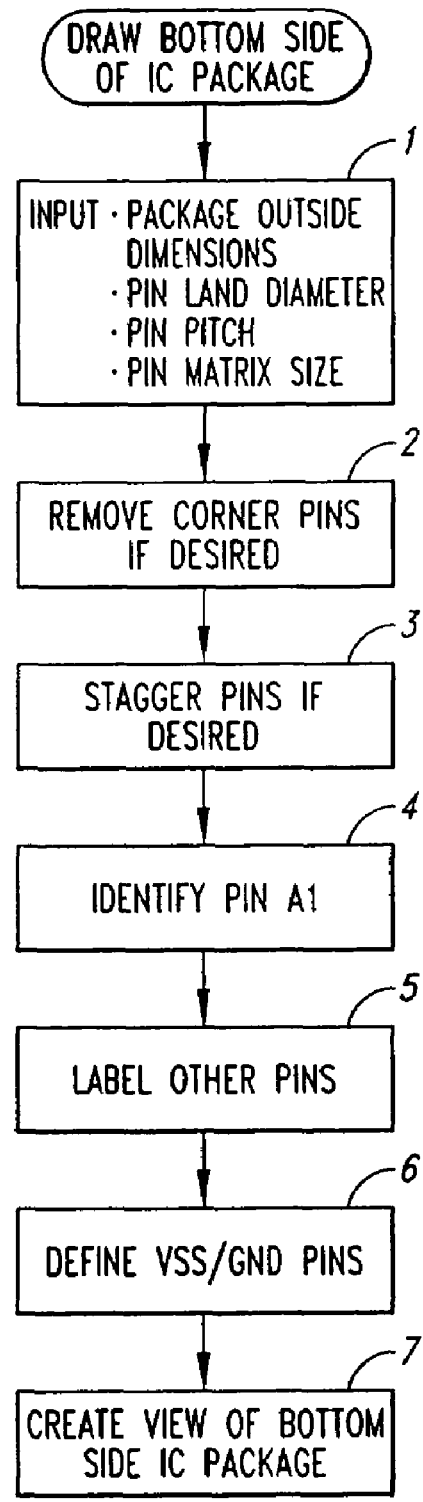
FIG. 3 illustrates the logical operations for drawing the bottom side of the package, in accordance with one embodiment of the present invention.

Operations 1 and 2 of FIG. 2 will now be described with reference to FIGS. 3–4 and 5–6, respectively. FIG. 3 illustrates the logical operations for creating a view of the bottom side of an IC package, in accordance with one embodiment of the present invention.

At operation 1 of FIG. 3, data about the package is obtained. In one example, the data obtained includes the package outside dimensions, the geometries of the bottom side conductors (such as the diameter of the pin lands and the distance between the centers of the pins (pin pitch)), and the pin matrix size of the bottom side conductors (such as 8×8).

At operation 2 of FIG. 3, the corner pins are removed so that they will not be displayed or used, and at operation 3, the pins are staggered, if desired. Operations 2 and 3 of FIG. 3 are optionally performed, if desired by the user, so that the computer model of the package matches the physical layout of the actual package. Alternatively, if the footprint of the bottom side conductors of the package is available, it can be used in place of operations 1–3.

At operation 4, the Pin A1 identification is made—for example, the user selects which pin of the package is the "A1" pin (also commonly referred to as the Pin #1 corner)—and at operation 5, the remaining pins are labeled, in one example using JEDEC pin labeling conventions. At operation 6, the power (i.e., VDD) and ground pins (i.e., VSS) of the package are identified.

Figure 4A:
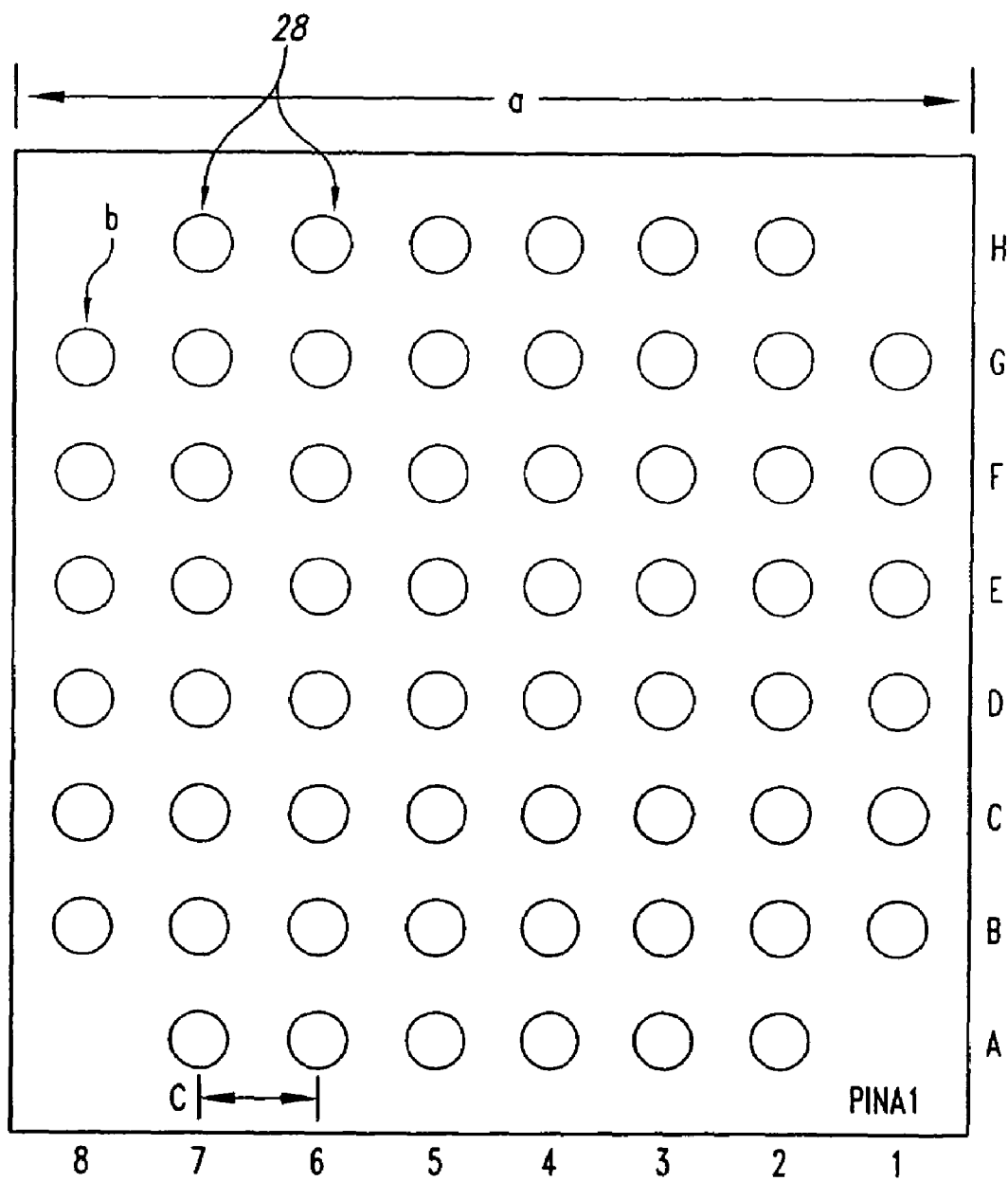
FIG. 4A illustrates a sample display of a drawing of the bottom side of an example package.
Figure 4B:
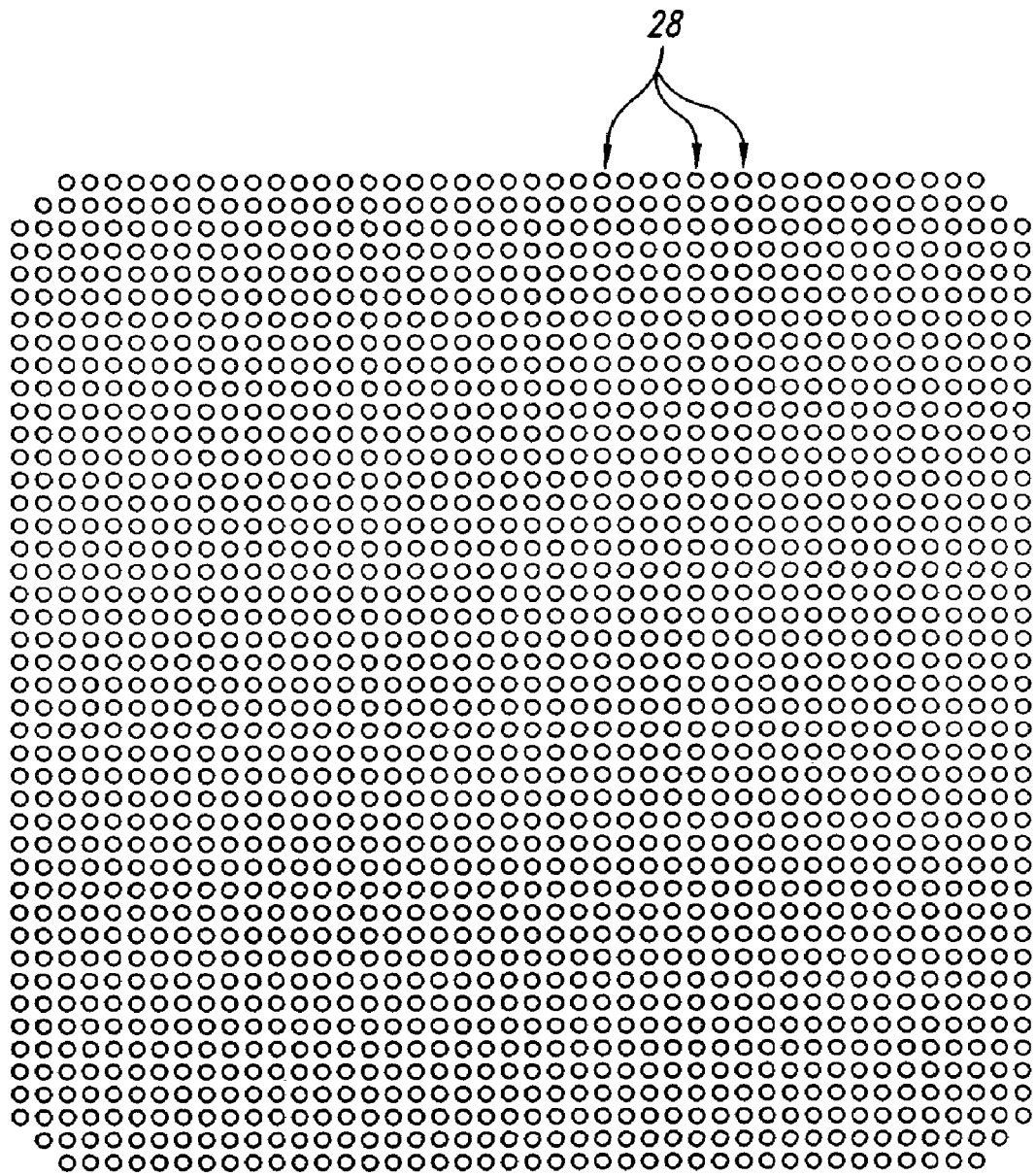
FIG. 4B illustrates a sample display of a drawing of the bottom side of another example package.

At operation 7, a view of the bottom side of the package is generated and displayed to the user, and in one example the view generated is based on the data obtained from operations 1–6. FIGS. 4A and 4B illustrate views of different examples of packages—in FIG. 4A, a very simple package having 60 bottom side conductors 28, and in FIG. 4B, a larger package having 1,924 bottom side conductors 28. In one example, the view generated and displayed to the user of the bottom side conductors is drawn looking through the top side of the package as if the package material were transparent.

Figure 5:
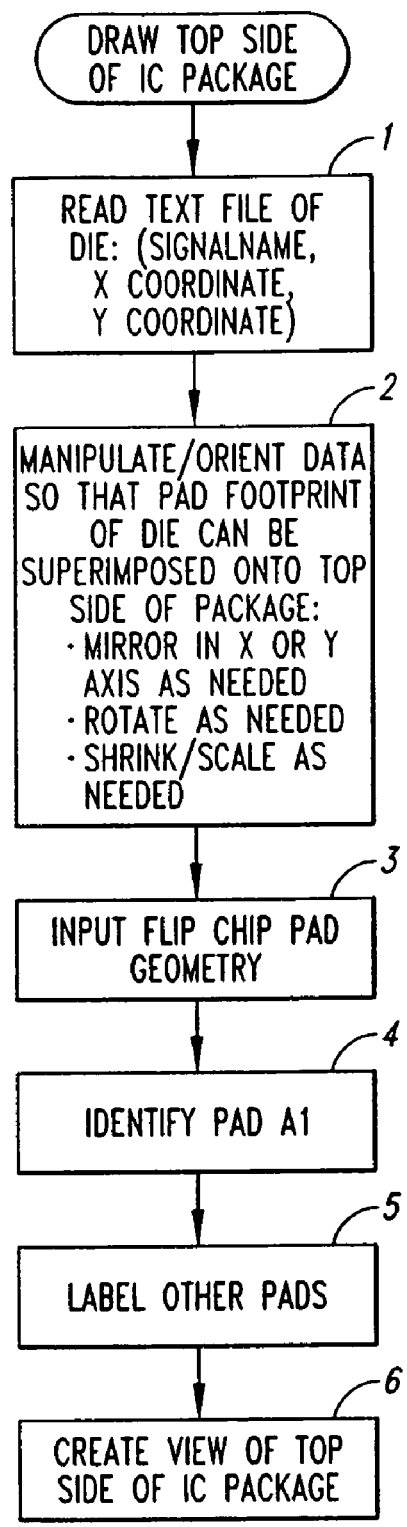
FIG. 5 illustrates the logical operations for drawing the top side of the package, in accordance with one embodiment of the present invention.

The logical operations for generating a model or view of the top side conductors of the package are shown in FIG. 5. At operation 1, geometric data about the top side conductors is obtained. In one embodiment, a text file of the die is read to obtain, for each conductor of the die, the signal_name, the X coordinate of the conductor, and the Y coordinate of the conductor. From this information, the geometries of the top side of the package can be derived. At operation 2, the data obtained from operation 1 is manipulated so that the footprint of the die can be superimposed on the top side of the package. In one embodiment, a mirror function is performed (which conceptually flips the image about the X or Y axis as needed), and the image is rotated or scaled (reduced or enlarged) as needed. At operation 3, the flip chip pad geometry of the die is obtained (such as the flip chip pad diameters or dimensions), so that each of the top side conductors of the package can be properly selected and sized to support the corresponding flip chip die pad geometry according to normal practices. Alternatively, if the footprint of the top side conductors is available, it can be used in place of operations 1–3.

Figure 6A:
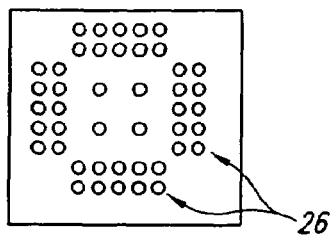
FIG. 6A illustrates a sample display of a drawing of the top side of an example package.
Figure 6B:
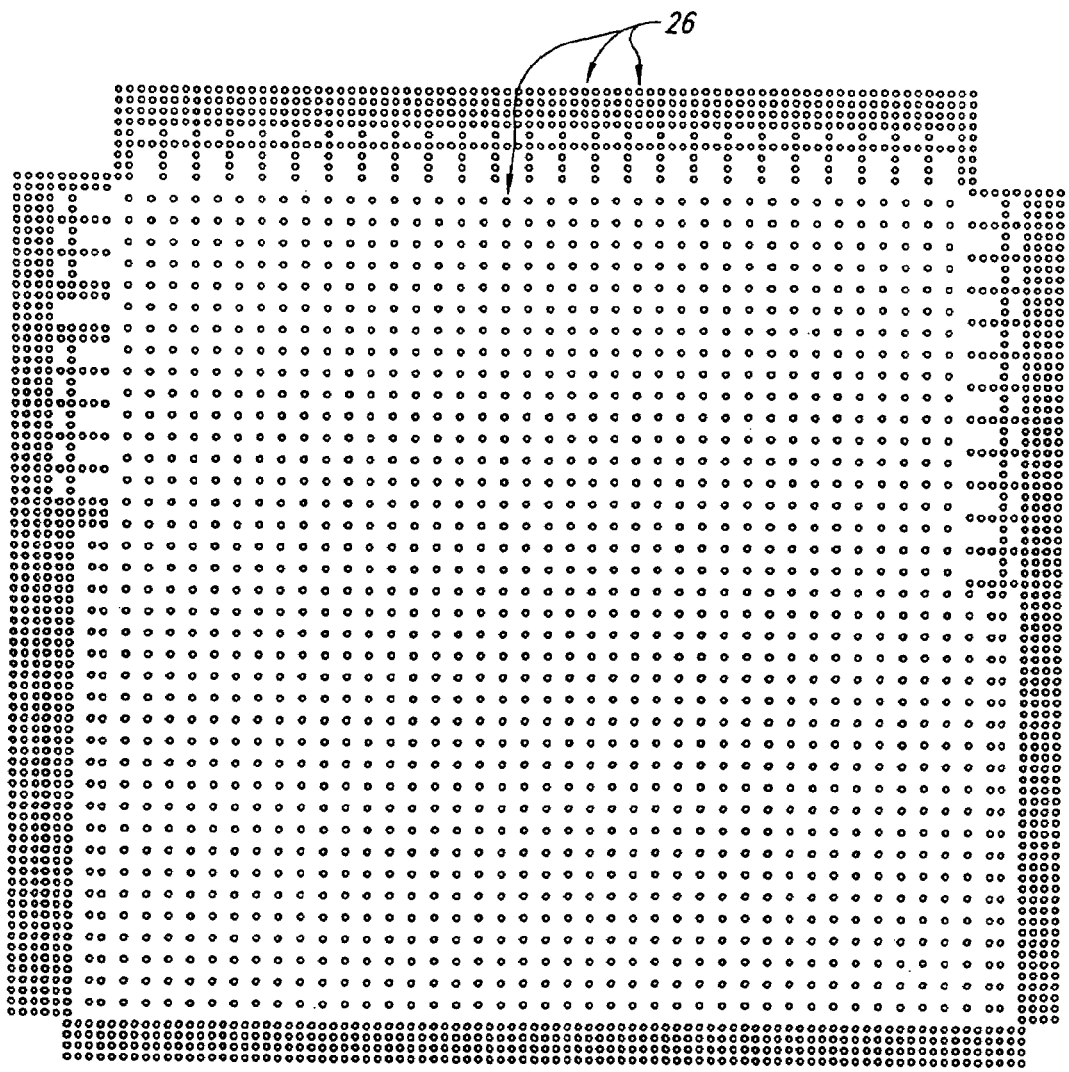
FIG. 6B illustrates a sample display of a drawing of the top side of another example package.

At operation 4 of FIG. 5, the "A1" top side conductor is identified, and at operation 5, the remaining top side conductors are labeled, in one embodiment using conventional JEDEC labeling conventions. At operation 6, a view of the top side of the package is generated and displayed to the user, and in one example the view generated is based on the data obtained from operations 1–5. FIGS. 6A and 6B illustrate views of different examples of packages—in FIG. 6A, the package has forty-four top conductors 26, and in FIG. 6B, the package has 2,499 top conductors 26. In one example, the view generated and displayed to the user is drawn looking through the top side of the package.

Figure 7A:
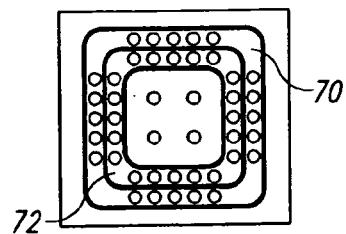
FIG. 7A illustrates an example of a drawing layout of a top side of the package with rings shown therein, in accordance with one embodiment of the present invention.
Figure 7B:
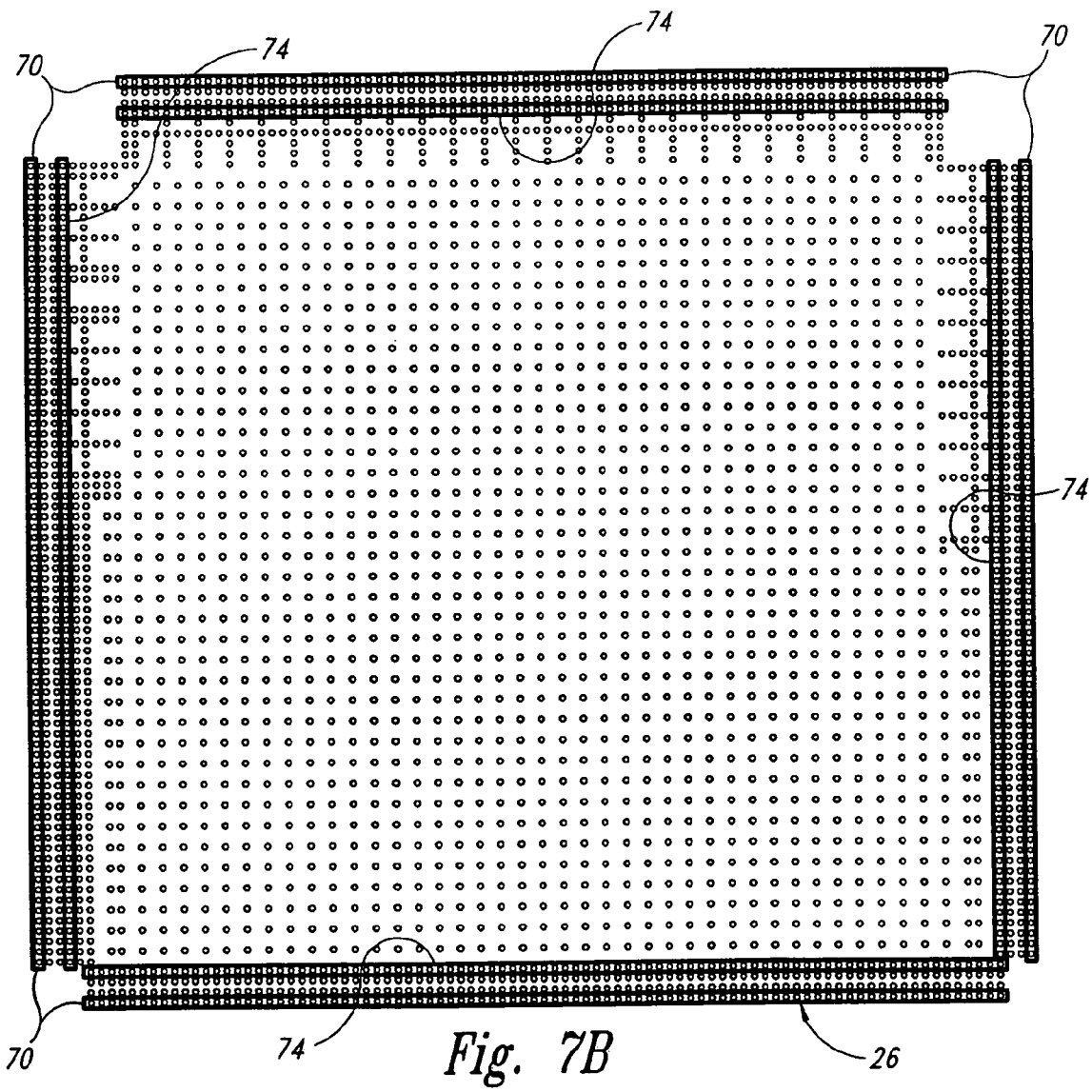
FIG. 7B illustrates another example of a drawing layout of a top side of another package with rings shown therein, in accordance with one embodiment of the present invention.

Now referring again to FIG. 2, at operation 3 one or more rings are defined for the top side conductors. These rings are groupings of rows of conductors, and in one embodiment a ring includes a single row of top side conductors, as will be described with reference to FIGS. 7A and 7B. In one embodiment, the rings are labeled as in ascending order beginning from the outer rows of the top side conductors (Ring 1, shown as 70) to the inner rows of top side conductors (Ring 2 (shown as 72), Ring 3 (shown as 73), Ring 4 (shown as 74), etc.), as shown in FIGS. 7A and 7B. In one example, a ring includes all of the conductors of a row along all sides of the top side conductors (see FIGS. 7A and 7B) so that each signal in the ring can be later routed to the corresponding bottom side conductor using a via from the ring down to a particular routing layer within the package, as described with reference below to FIG. 16.

Figure 8:
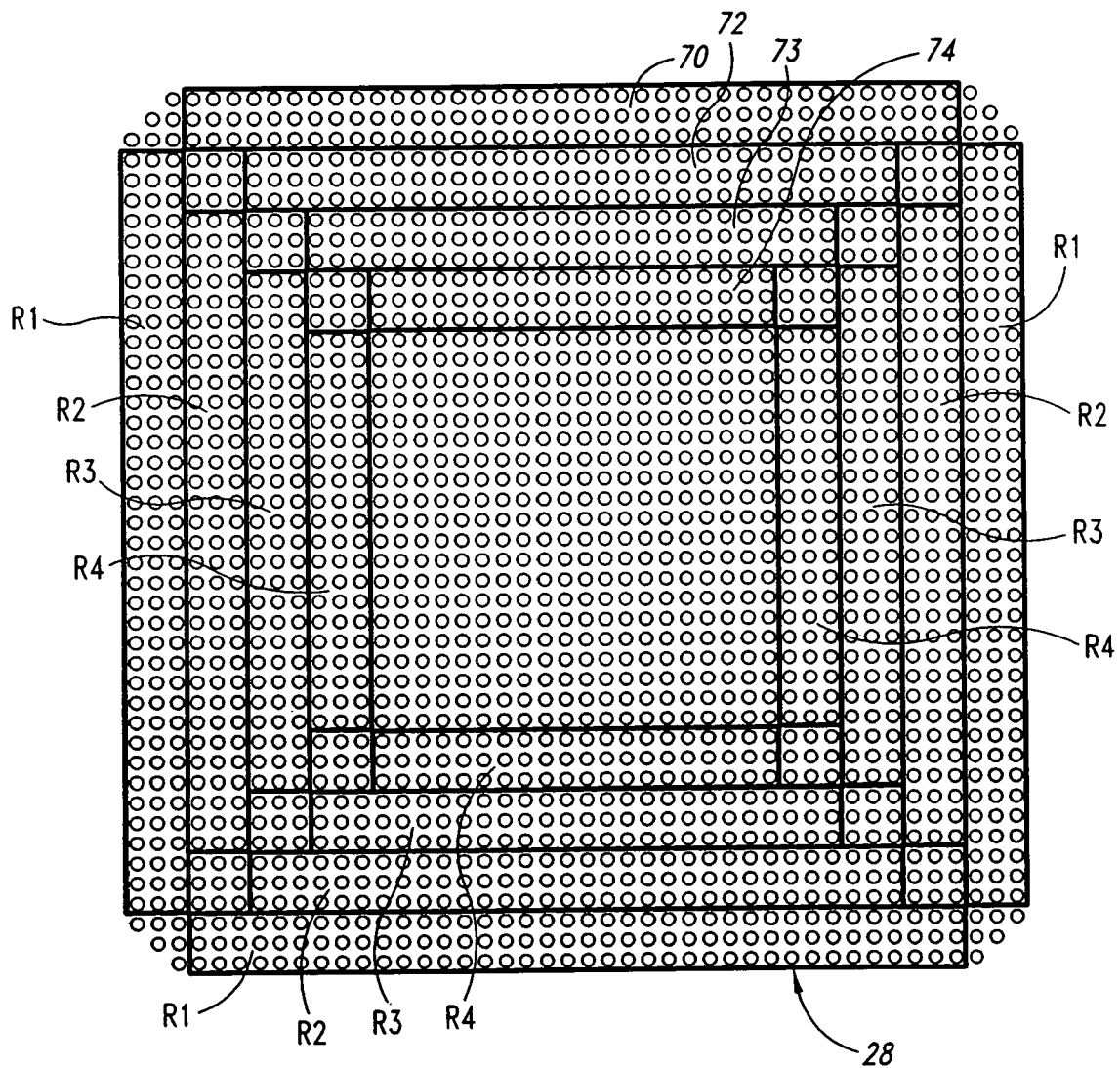
FIG. 8 illustrates an example of a drawing layout of a bottom side of the package with rings shown therein, in accordance with one embodiment of the present invention.

At operation 4 of FIG. 2, one or more rings are defined for the bottom side conductors. These rings are groupings of rows of conductors, and in one embodiment a ring includes three rows of bottom side conductors, as shown in FIG. 8. In one embodiment, the rings are labeled as in ascending order beginning from the outer three rows of the bottom side conductors (Ring 1), to the next 3 inner rows of bottom side conductors (Ring 2), to the next 3 inner rows of bottom side conductors (Ring 3), to the next 3 inner rows of bottom side conductors (Ring 4), etc., as shown in FIG. 8. In one embodiment, a ring includes all of the conductors of three rows along all sides of the bottom side conductors of the package, as shown in FIG. 8, excepting the conductors about a corner, which are excluded. In one embodiment, the unused bottom side conductors are logically connected to ground.

At operation 5 of FIG. 2, one or more signal sets for the top side conductors are defined. A signal set is a set or grouping of top side conductors. In one embodiment, one or more portions of the top side conductors are arranged in signal sets, wherein each signal set includes three top side conductors. Such an arrangement of signal sets can provide for differential pair groupings to enhance signal integrity in a package supporting high frequency switching signals, such as for an integrated circuit in a router. Table 1 shows the various combinations of signal sets for the top side conductors, in accordance with one embodiment of the present invention.

TABLE 1

Signal set arrangements

For differential pairs:
    Signal_Positive, Signal_Negative, Gnd (or any permutation thereof)
    Signal_Positive, Signal_Negative, Pwr (or any permutation thereof)

TABLE 1-continued

Signal set arrangements

For single-ended signals:
    Signal, Gnd, Gnd (or any permutation thereof)
    Signal, Pwr, Pwr (or any permutation thereof)
    Signal, Pwr, Gnd (or any permutation thereof)
    Signal, Signal, Gnd (or any permutation thereof)
    Signal, Signal, Pwr (or any permutation thereof)
where "Signal_Positive" represents a positive signal of a differential pair
    "Signal_Negative" represents a negative signal of a differential pair
    "Signal" represents a single-ended signal
    "Pwr" represents a power signal
    "Gnd" represents a ground signal It is understood that while the signal set arrangements shown include three signals in the examples discussed, a signal set could include other numbers of signals, as desired. In addition, the ratio of "Signal" to "Pwr" and/or "Gnd" may change depending on the electrical requirements for the signals to operate properly for a given design. There may be multiple signal sets defined for the top side conductors, and the multiple signal sets may be of different sizes (i.e., contain different numbers of conductors), as desired.

Figure 9:
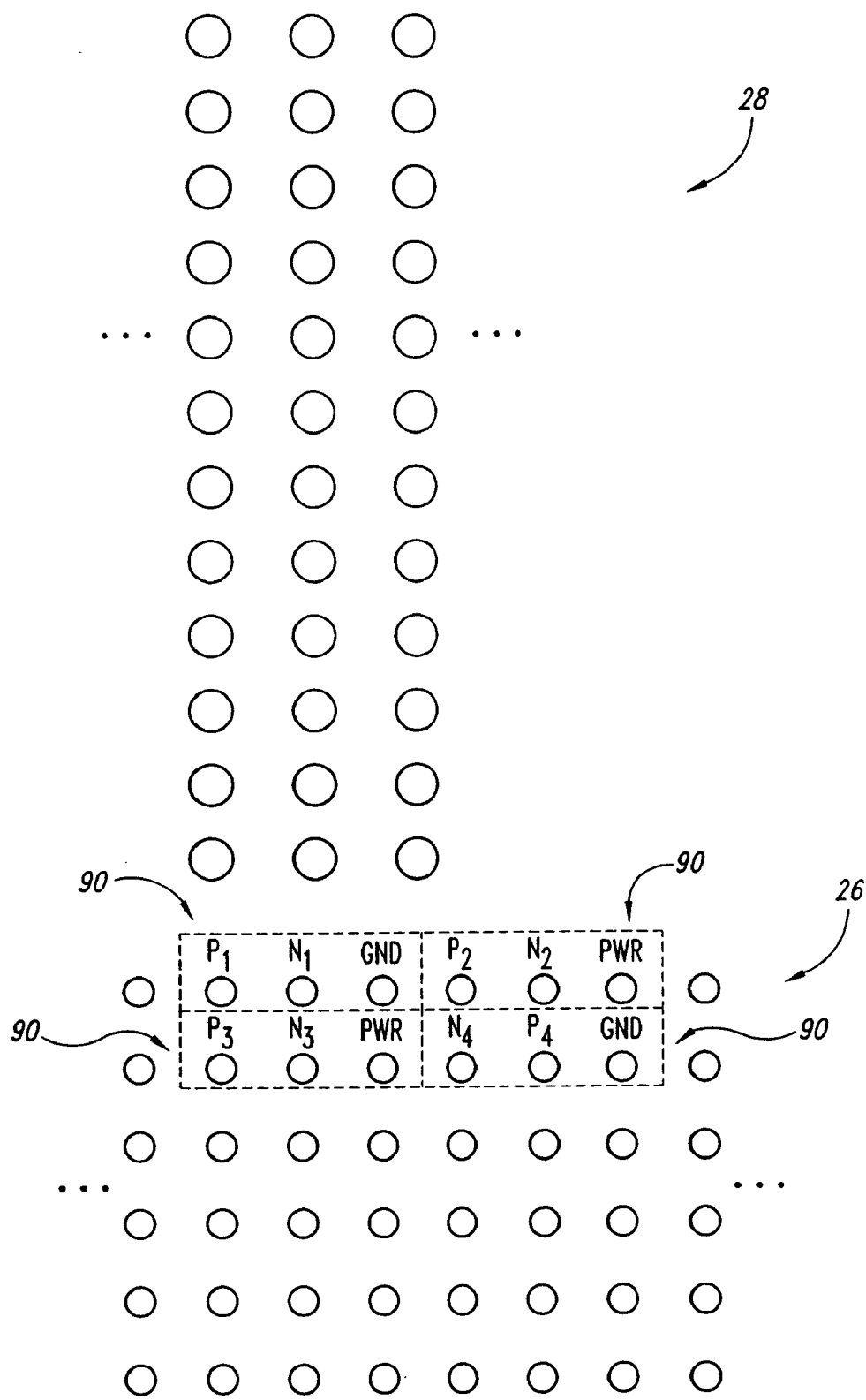
FIG. 9 illustrates an example of a portion of bottom side conductors, and a portion of top side conductors arranged in signal sets, in accordance with one embodiment of the present invention.

In one embodiment, sets of signals/conductors from the top side conductors are defined so that for each set, the conductors within a set are adjacent with another conductor in the set, and so each conductor of the set is within the same ring of the top side conductors. This arrangement 90 is generally illustrated in FIG. 9. For instance in the example shown in FIG. 9, in the signal set 90 having P1 (a positive signal of a differential pair), N1 (a negative signal of a differential pair), and Gnd (ground), each signal is adjacent another signal in the set, and each signal in this set is within Ring 1 of the top side conductors. Similarly, the signal set having P4, N4 and Gnd is within Ring 2 of the top side conductors.

Figure 10:
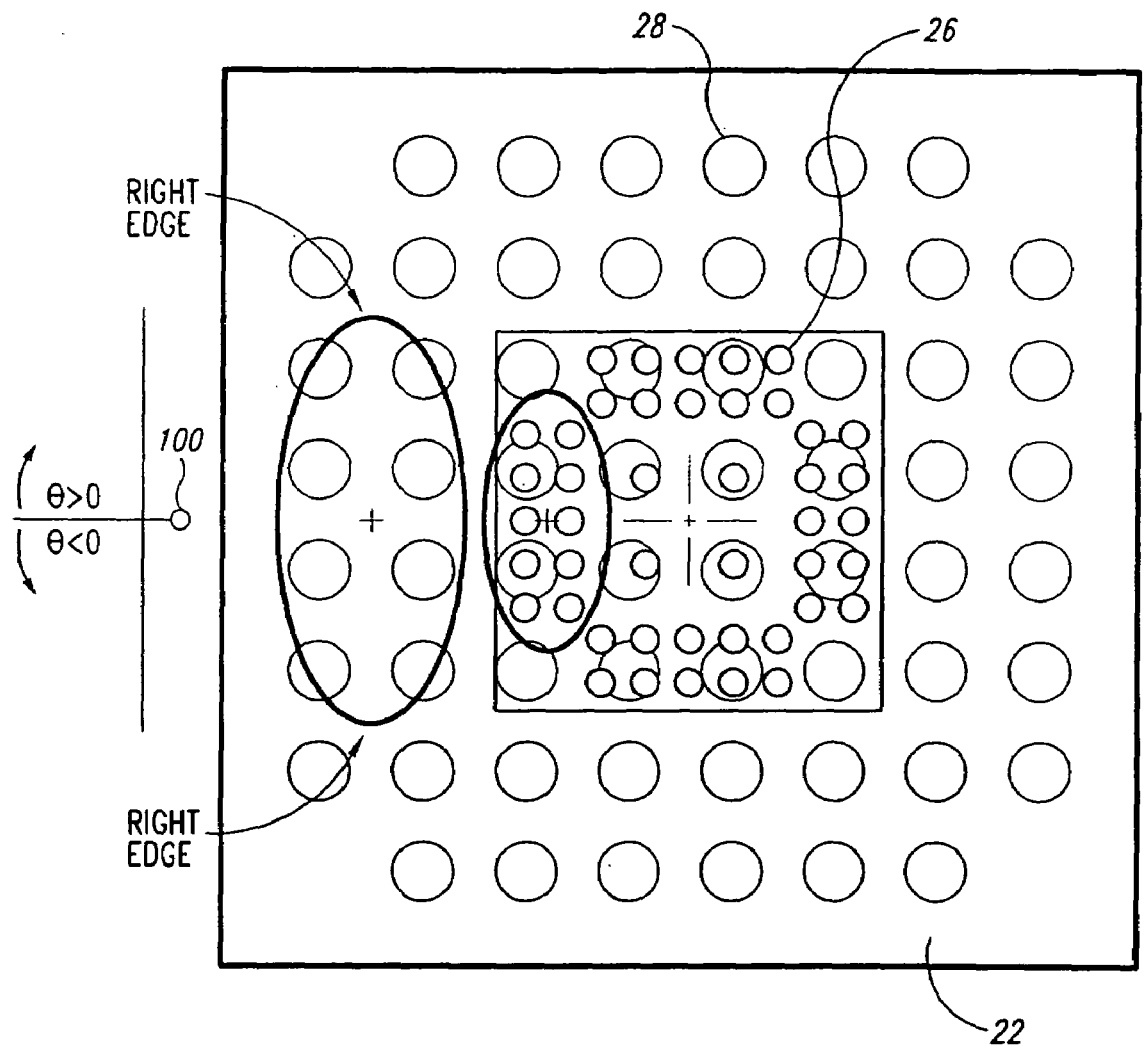
FIG. 10 illustrates a sample display of a user-selection of a region of top side conductors selected to be connected to a region of bottom side conductors, in accordance with one embodiment of the present invention.

Referring again to FIG. 2, at operation 6, a region of the top side conductors is selected for automatic logical connection to a region of the bottom side conductors. One example of this operation is shown in FIG. 10, wherein within the GUI, the user can select or highlight a region of the top side conductors, and the user can select or highlight a region of the bottom side conductors. Generally, selections for connections are made on a "one-side-at-a-time" basis wherein the user would select groups of conductors from a first side of the package for automatic connection before selecting groups of conductors from a second side of the package for automatic connection.

Operation 6, in one example, determines if the number of bottom side conductors (i.e., pins) selected equals the number of top side conductors (i.e., pads) before the automatic connection operation 7 is performed. If the number of bottom side conductors is not equal to the number of top side conductors, then the user is prompted to take action to increase the number of bottom side conductors so as to make them equal (i.e., if the number of bottom side conductors is less than the number of top side conductors, then the user is requested to select more bottom side conductors).

Alternatively, operation 6 can automatically select all of the top side conductors to be automatically connected to bottom side conductors. If the software automatically selects all of the top side conductors for connection to the bottom side conductors, in one example the software sub-divides the automatic connection process into four groups of operations, by first selecting a first side of the top side conductors and making those connections to the corresponding first side of the bottom conductors, then selecting a second side of the top side conductors and making those connections to the corresponding second side of the bottom conductors, then selecting a third side of the top side conductors and making those connections to the corresponding third side of the bottom conductors, and then selecting a fourth side of the top side conductors and making those connections to the corresponding fourth side of the bottom conductors.

Referring again to FIG. 2, at operation 7, the selected top side conductors are logically connected automatically to the bottom side conductors while maintaining the signal set relations. The logical connections made are later provided to routing software to that the logical connections between conductors can be routed through the various internal layers of the package. One embodiment of operation 7 of FIG. 2 is further described in FIGS. 11–12.

Figure 11:
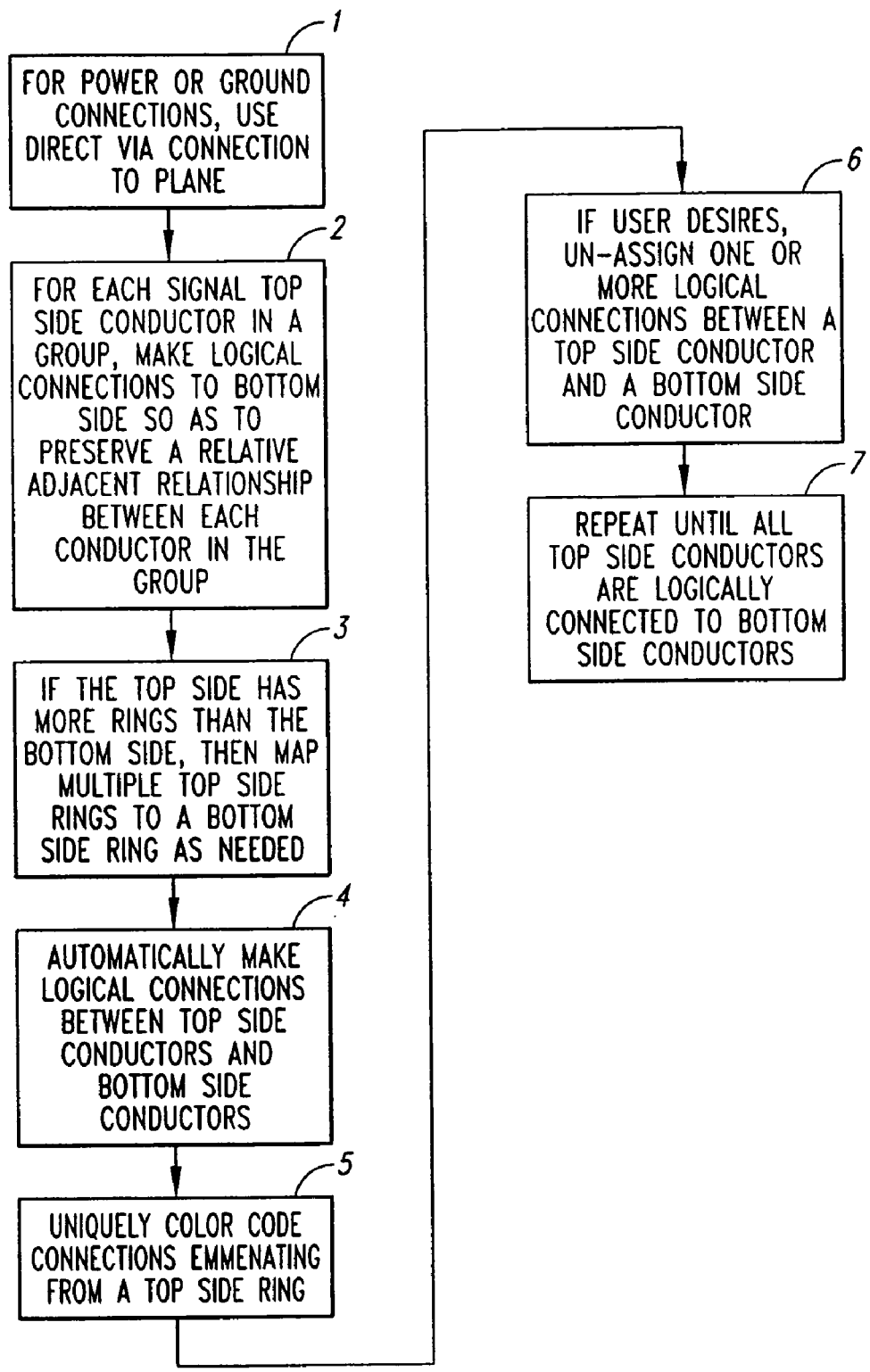
FIG. 11 illustrates logical operations for automatically connecting top side conductors to bottom side conductors of an integrated circuit package, in accordance with one embodiment of the present invention.

Referring to FIG. 11, at operation 1, power or ground connections are made using via connections to the appropriate power or ground planes. In this manner, the power or ground connections do not complicate the numerous connections between top and bottom side conductors which carry signal lines. It is understood that the Pwr and Gnd vias decrease the routable area on each signal routing layer through which they pass, and this issue may be addressed by the design tool, as needed.

At operation 2, for each top side conductor arranged in a set, logical connections to the bottom side conductors are made so as to preserve a relative relationship between each conductor in the set. In this manner, if a set of top conductors contains (P1, N1, Gnd), then the connections made to the bottom side conductors will contain (P1, N1, Gnd) in an adjacent or proximate relationship. In one embodiment of the invention, while top side conductors are arranged in a set within a single top conductor ring (which in FIG. 9, are drawn horizontally), the arrangement of the respective connections to bottom side conductors is generally orthogonal (shown as vertical in FIG. 13), in one example.

At operation 3, if the top side has more rings than the bottom side, then multiple top side rings are mapped to a bottom side ring as needed. For example, where the top side has 6 rings, and the bottom side has 4 rings, the following mapping shown in Table 2 can be used:

TABLE 2

Example of Mapping between Top Side Rings (6) and Bottom Side Rings (4)

| Top Side Rings | Mapped to | Bottom Side Rings |
|---|---|---|
| Rings 1 & 2 | | Ring 1 |
| Rings 2, 3, & 4 | | Ring 2 |
| Rings 3, 4, & 5 | | Ring 3 |
| Rings 4, 5, & 6 | | Ring 4 |

By sharing a bottom side ring amongst multiple top side rings, all of the top side conductors can be logically connected to the bottom side conductors so that all of the top side conductors are assigned to the bottom side conductors. If the bottom side has more rings than the top side, a similar sharing arrangement can be used. While the sharing arrangement shown in Table 2 is for an example where there are 6 top side rings and 4 bottom side rings, different sharing arrangements can be used where the number of rings on the top side and bottom side differ.

Figure 12:
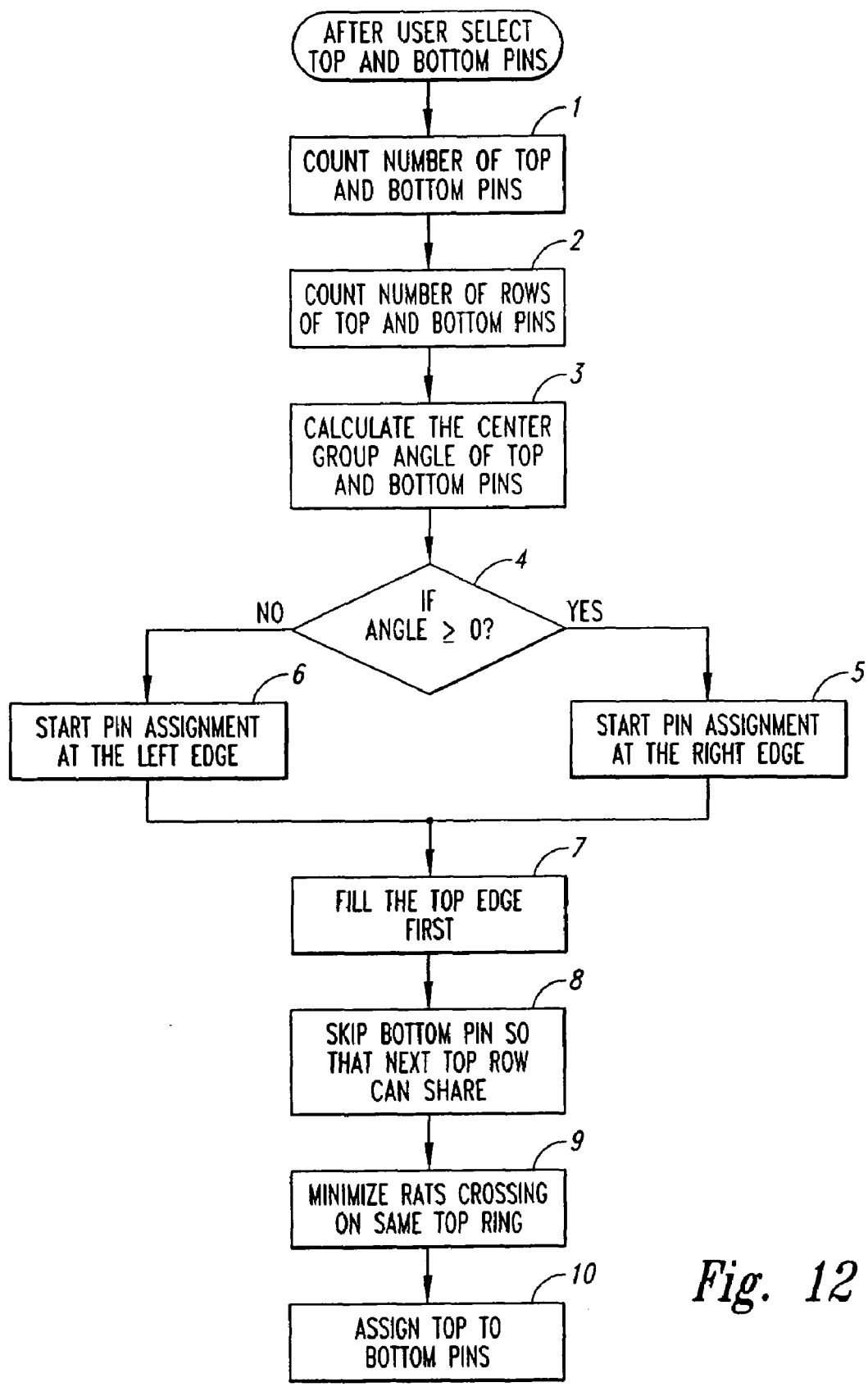
FIG. 12 illustrates logical operations for connecting top side conductors to bottom side conductors, in accordance with one embodiment of the present invention.
Figure 13A:
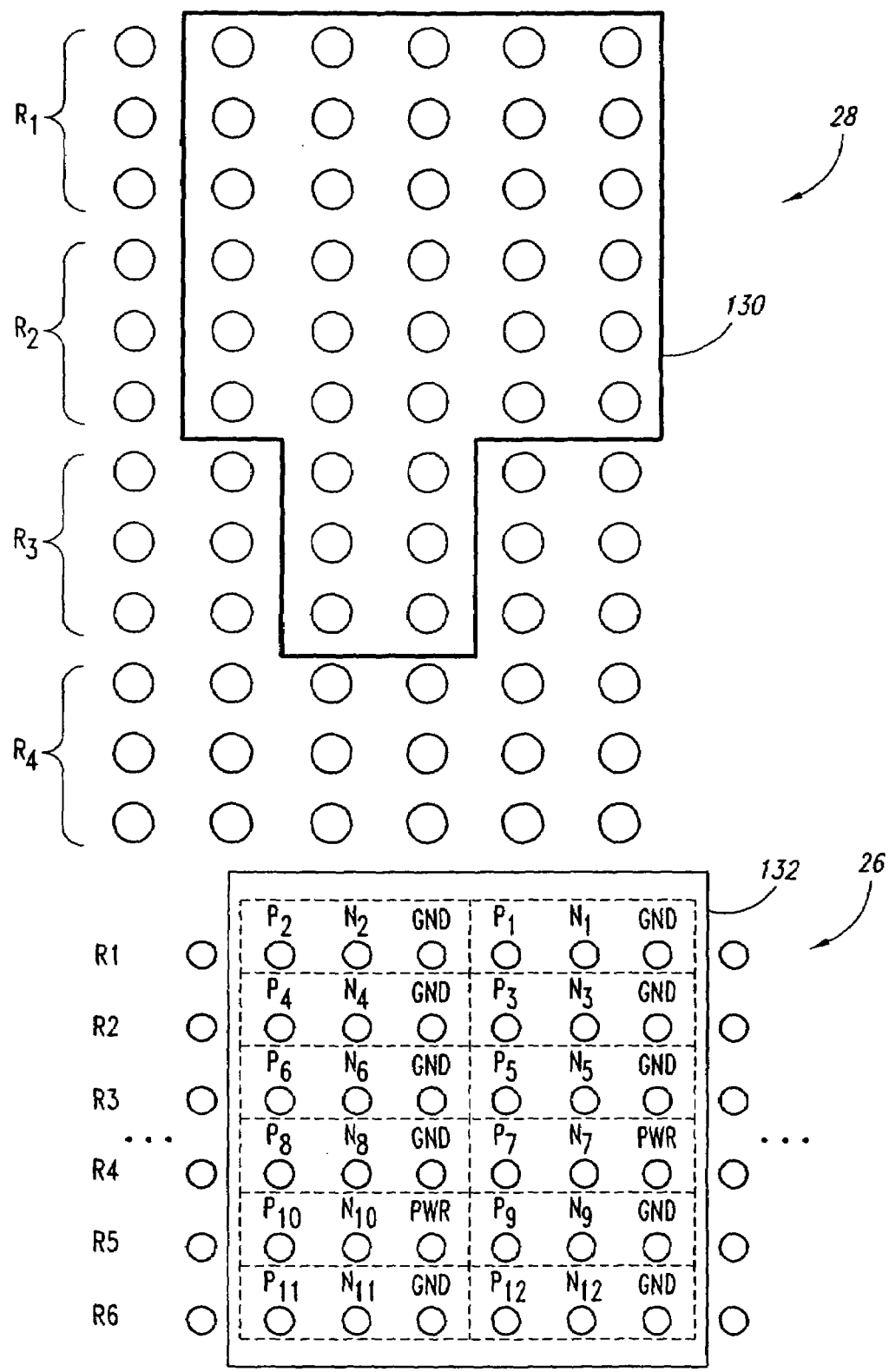
FIGS. 13A–J illustrate an example of a process for connecting top side conductors with bottom side conductors, in accordance with one embodiment of the present invention.
Figure 13B:
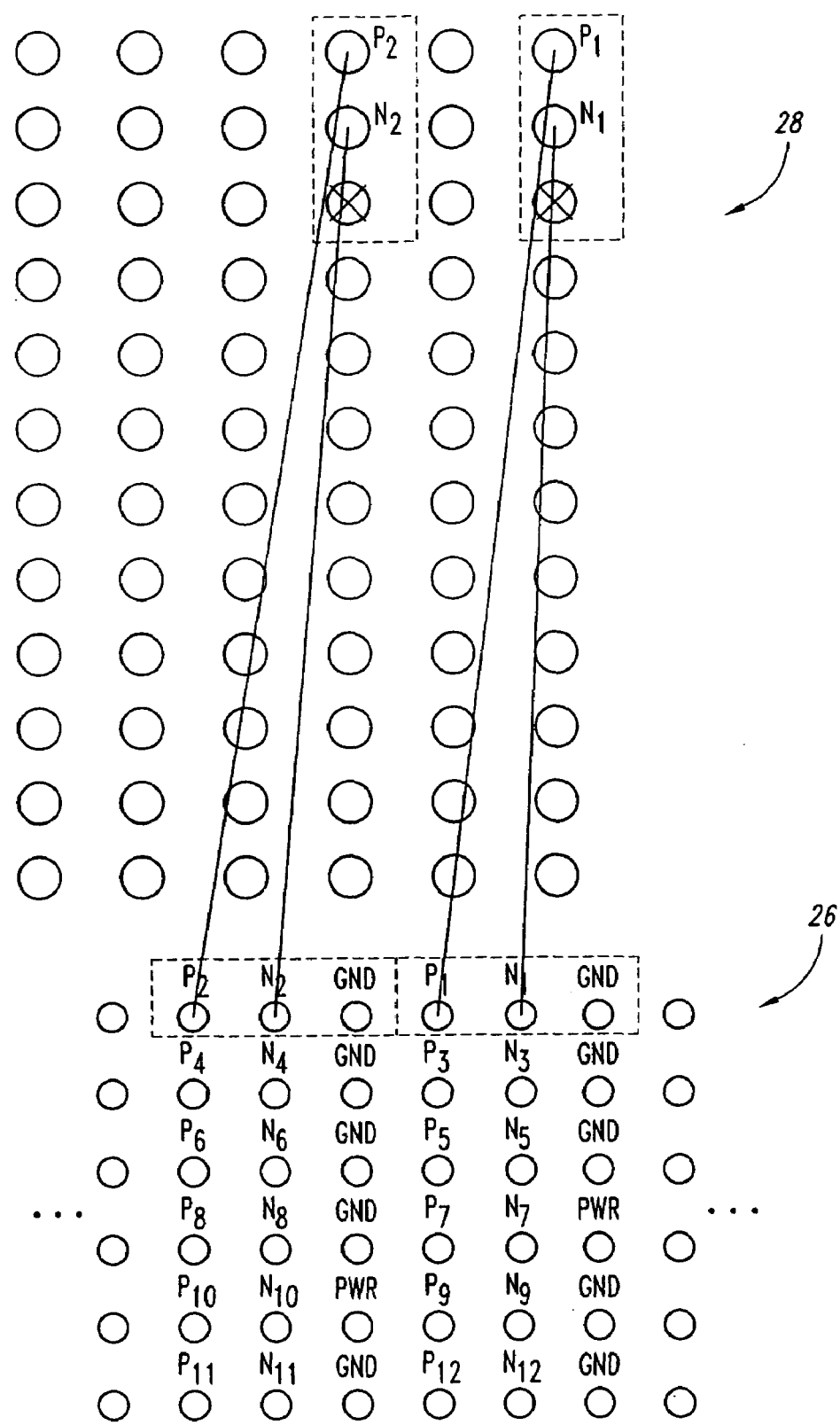

At operation 4 of FIG. 11, the logical connections between top side conductors and bottom side conductors is automatically made. FIG. 12 illustrates one embodiment of the logical operations for making logical connections. FIG. 12 assumes that a set of top conductors has been selected to be connected to a set of bottom conductors—selected either by the user or automatically by the software. FIGS. 13A–B illustrate one example of logical connections made according to the operations of FIGS. 11–12.

For a selected groups of conductors, operations 1–3 determine the angle between midpoints of the groups of top and bottom pins selected for connection, and operations 4–6 determine where automatic connections should begin within those groups. Operations 5–9 (along with operations 1–3 of FIG. 11) are in effect "design rules" for making the logical connections between top and bottom side conductors, in accordance with one embodiment of the invention.

A reference axis 100 may be used to determine where automatic connections should begin, and one example of a reference plane is shown in FIG. 10. In one embodiment, if the angle between the midpoints is greater than or equal to zero, then the pin connections are made beginning at the right edge of the groups, and if the angle is less than zero, then the pin connections are made beginning at the left edge of the groups.

One way to determine the midpoints is shown in operations 1–2 of FIG. 12. At operation 1, the number of top conductors selected for connection is counted, and the number of bottom conductors selected for connection is also counted. At operation 2, the number of rows of the top conductors selected is counted, and the number of rows of the bottom conductors selected is counted. At operation 3, the center or midpoint of the group of the top conductors is determined based on the counts obtained as well as the geometries of the top conductors; and the center or midpoint of the group of the bottom conductors is determined based on the counts obtained as well as the geometries of the bottom conductors. Based on the positions of the midpoint of the group of top conductors relative the to the midpoint of the group of bottom conductors, the angle relative to a reference frame is determined. As shown in FIG. 10, the reference frame in one embodiment is from the geometric center of the package. FIG. 10 also shows the midpoints of each group of conductors, and the angle formed by the line connected between the midpoints relative to the reference frame (in the example, the angle is about 0 degrees).

Upon computing the angle, decision operation 4 determines whether the angle is greater than or equal to zero degrees, and if so, operation 5 marks the right edge of the groups to begin automatically connecting thereabout. If the angle is less than zero, the operation 6 marks the left edge of the groups to begin automatically connecting thereabout.

At operation 7 of FIG. 12, connections within the selected group of conductors will begin at the top portion of the right/left edge of the selected groups of conductors, in one embodiment of the invention. As logical connections are made between top and bottom side conductors beginning at the top outer portion of the group, the next connections made move inward and downward, generally. At operation 8, when a connection is made to a set of bottom side conductors, the next set of bottom side conductors is skipped so as to provide for sharing of bottom side rings, as explained above with reference to operation 3 of FIG. 12 and Table 2.

At operation 9 of FIG. 12, where connections are to be made between two conductors originating from a single top side ring, they are made so that crossings of signal lines should be minimized or avoided, in one embodiment of the invention. At operation 10 of FIG. 12, the top side conductors are logically connected to the bottom side conductors.

FIGS. 13A–J show one example of connections made in accordance with one embodiment of the present invention. In FIG. 13A, a portion 130 of bottom side conductors are shown as being selected to be logically connected with a portion 132 of selected top side conductors. As previously discussed, and as shown in FIG. 13A, the top side conductors have been arranged in sets, such as (P1, N1, ground); (P2, N2, ground); (P3, N3, ground); ... (P12, N12, ground); etc. FIGS. 13B–13I show the various steps for logical connections being made between the top side conductors and the bottom side conductors, in one example. Referring to FIG. 13B, logical connections are made between the top side and bottom side conductors, in accordance with logical operations 7–10 of FIG. 12, in one example. For instance, as shown in FIG. 13B, top side conductors (P1, N1, ground), being a set, are connected as shown in FIG. 13B, filling the top edge first (operation 7 of FIG. 12); and then top side conductors (P2, N2, ground) are connected to bottom side conductors as shown in FIG. 13B. Note that in FIG. 13B a column of bottom side conductors is skipped between the sets, in accordance with operation 8 of FIG. 12.

Figure 13C:
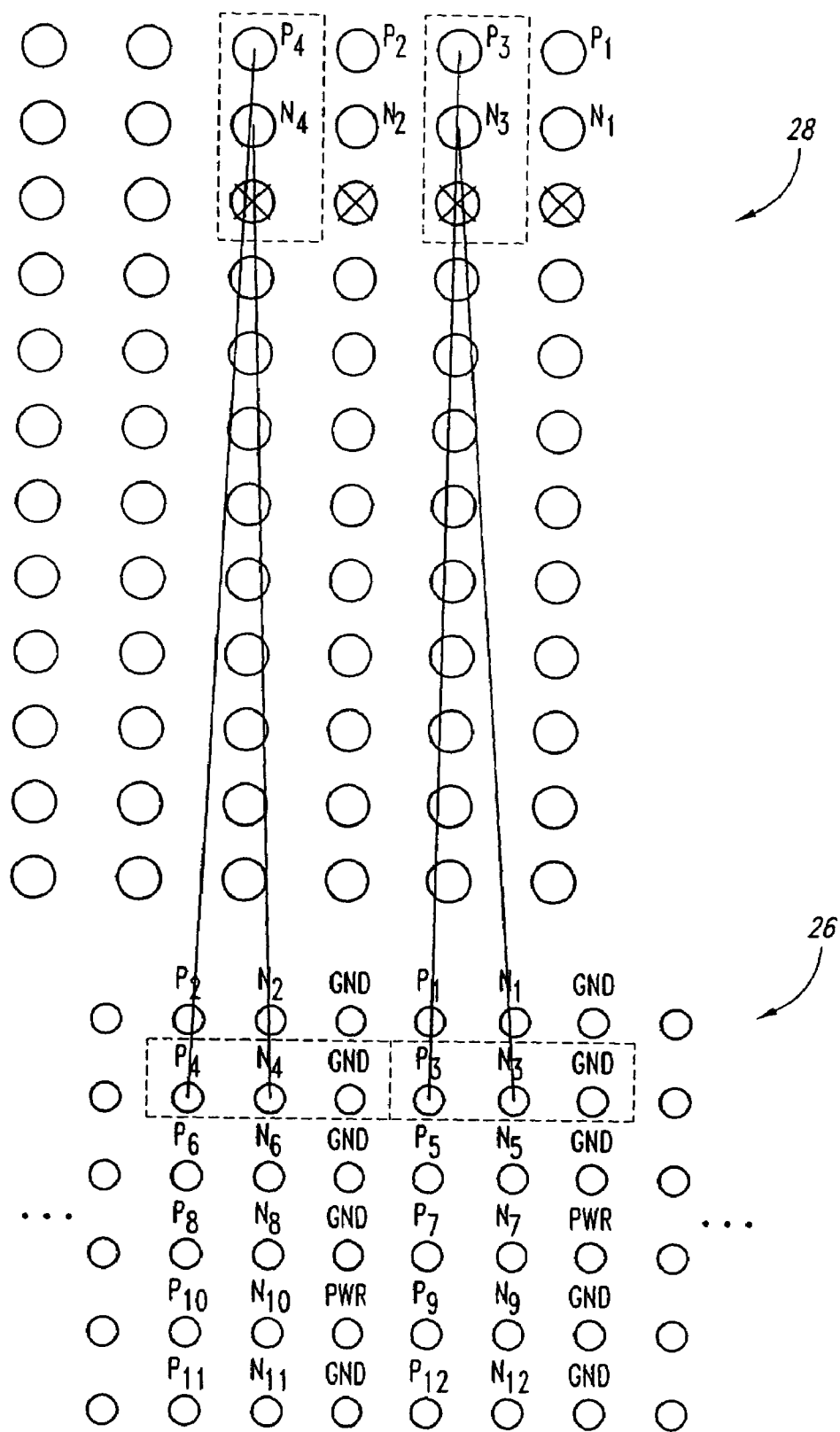

Referring now to FIG. 13C, top side conductor sets (P3, N3, ground) and (P4, N4, ground) are connected to bottom side conductors as shown. Note how (P3, N3, ground) are connected to the bottom side conductors in the column between the (P1, N1) set and the (P2, N2) set, which is in accordance with operation 8 of FIG. 12, in one example.

Figure 13D:
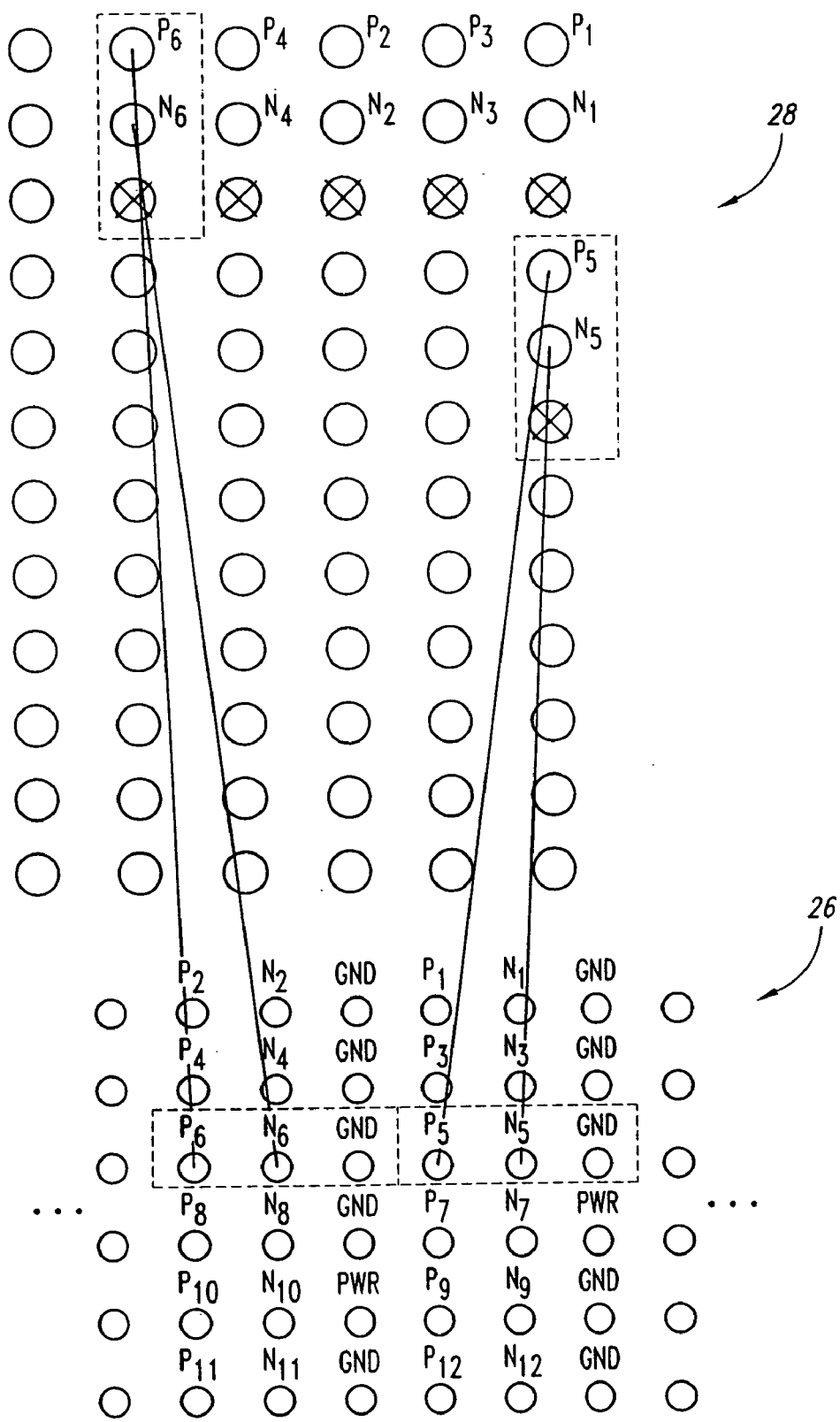

In FIG. 13D, top side conductor sets (P5, N5, ground) and (P6, N6, ground) are logically connected with the bottom side conductors as shown.

Figure 13E:
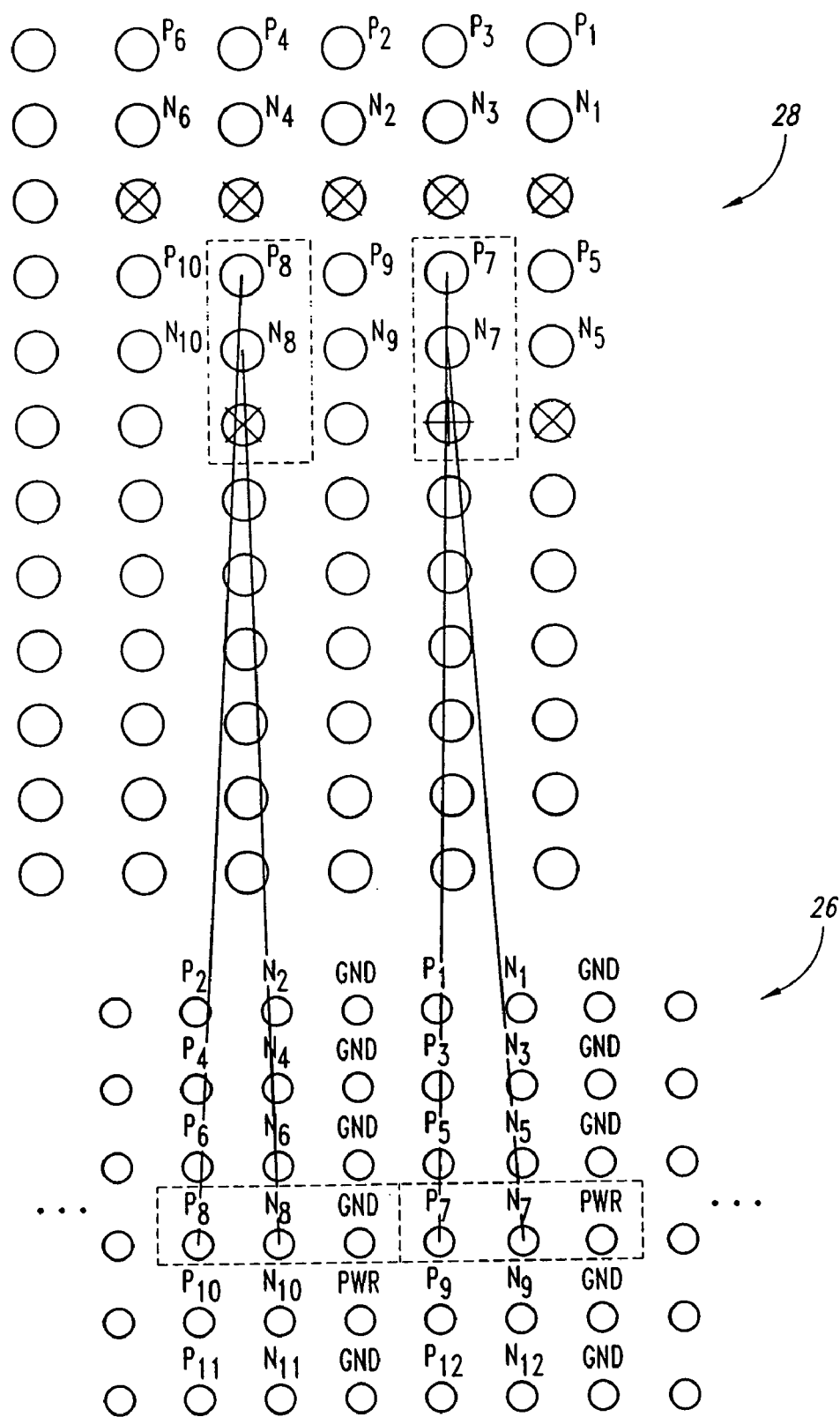

In FIG. 13E, top side conductors (P7, N7, power) are connected to bottom side conductors as shown, while top side conductor sets (P8, N8, ground) are connected with bottom side conductors as shown. Again, a portion of a column of conductors is skipped between the sets (P7, N7, power) and (P8, N8, ground) on the bottom side conductors.

Figure 13F:
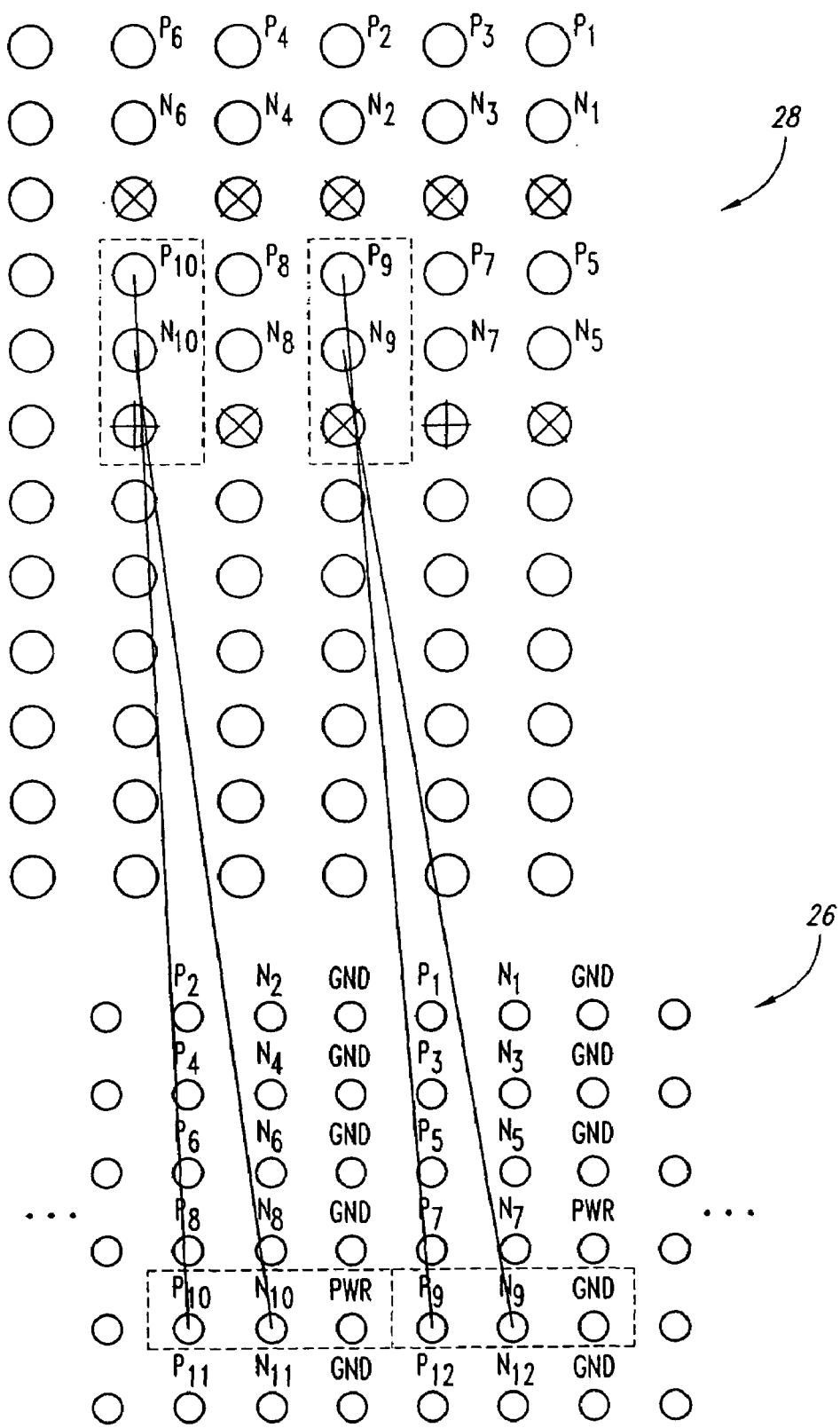
Figure 13G:
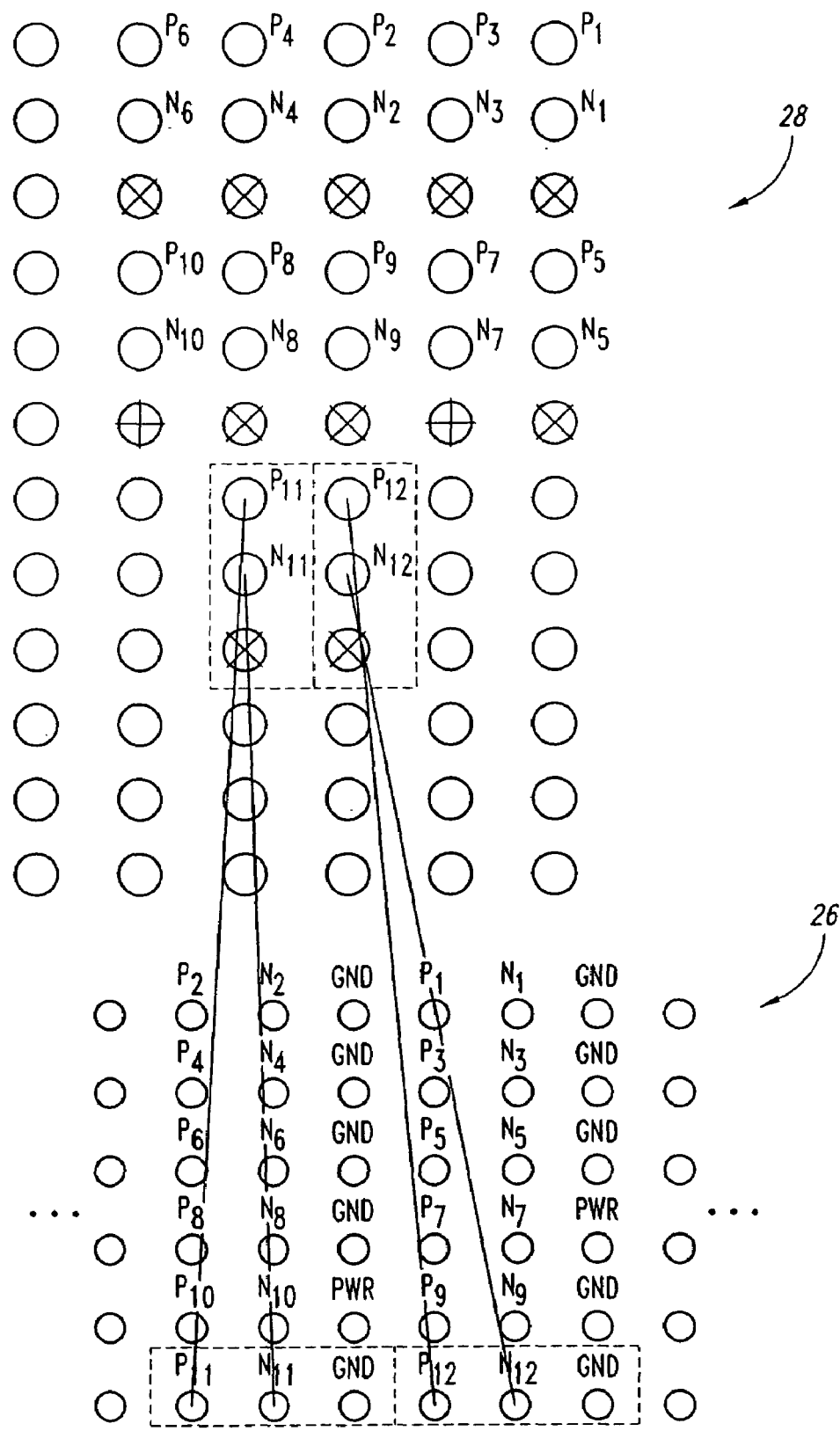

In FIG. 13F, top side conductor sets (P9, N9, ground) and (P10, N10, power) are logically connected to bottom side conductors as shown. In FIG. 13G, top side conductor sets (P12, N12, ground) and (P11, N11, ground) are connected with bottom side conductors as shown. In this instance, a portion of a column of conductors is not skipped between the sets (operation 8 of FIG. 12) because the region selected of bottom side conductors (see FIG. 13A) would not so permit.

Figure 13H:
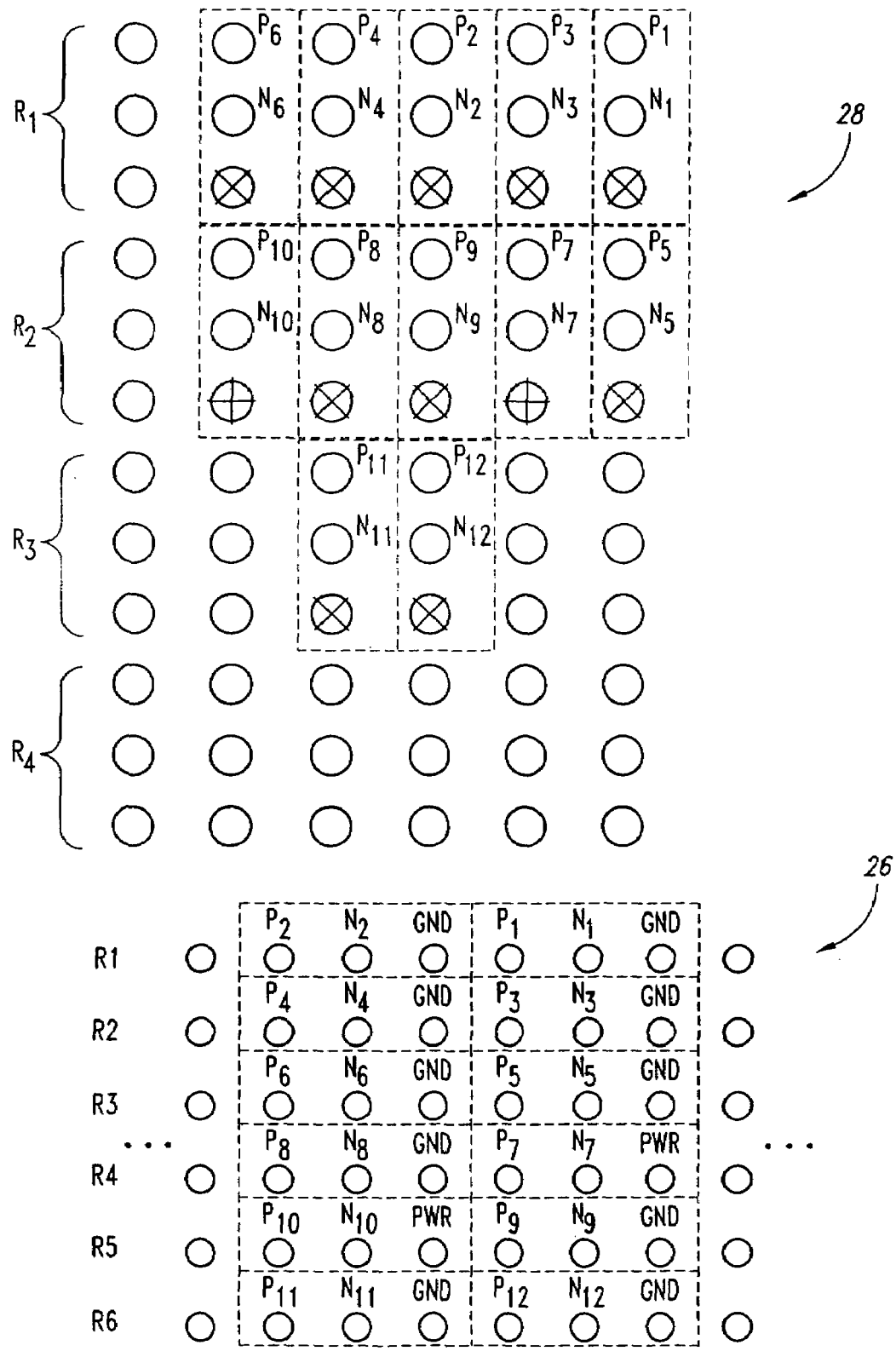
Figure 13I:
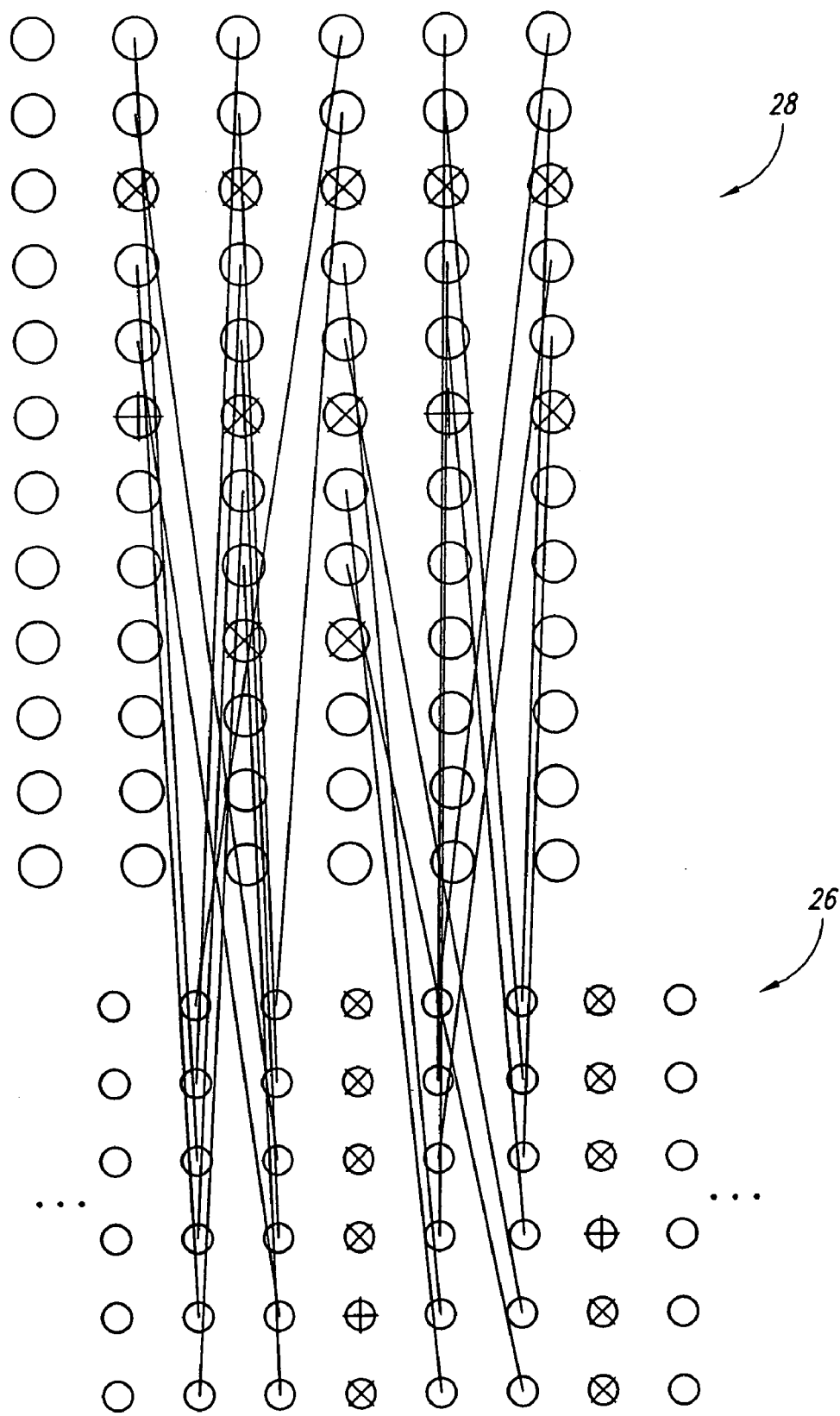
Figure 13J:
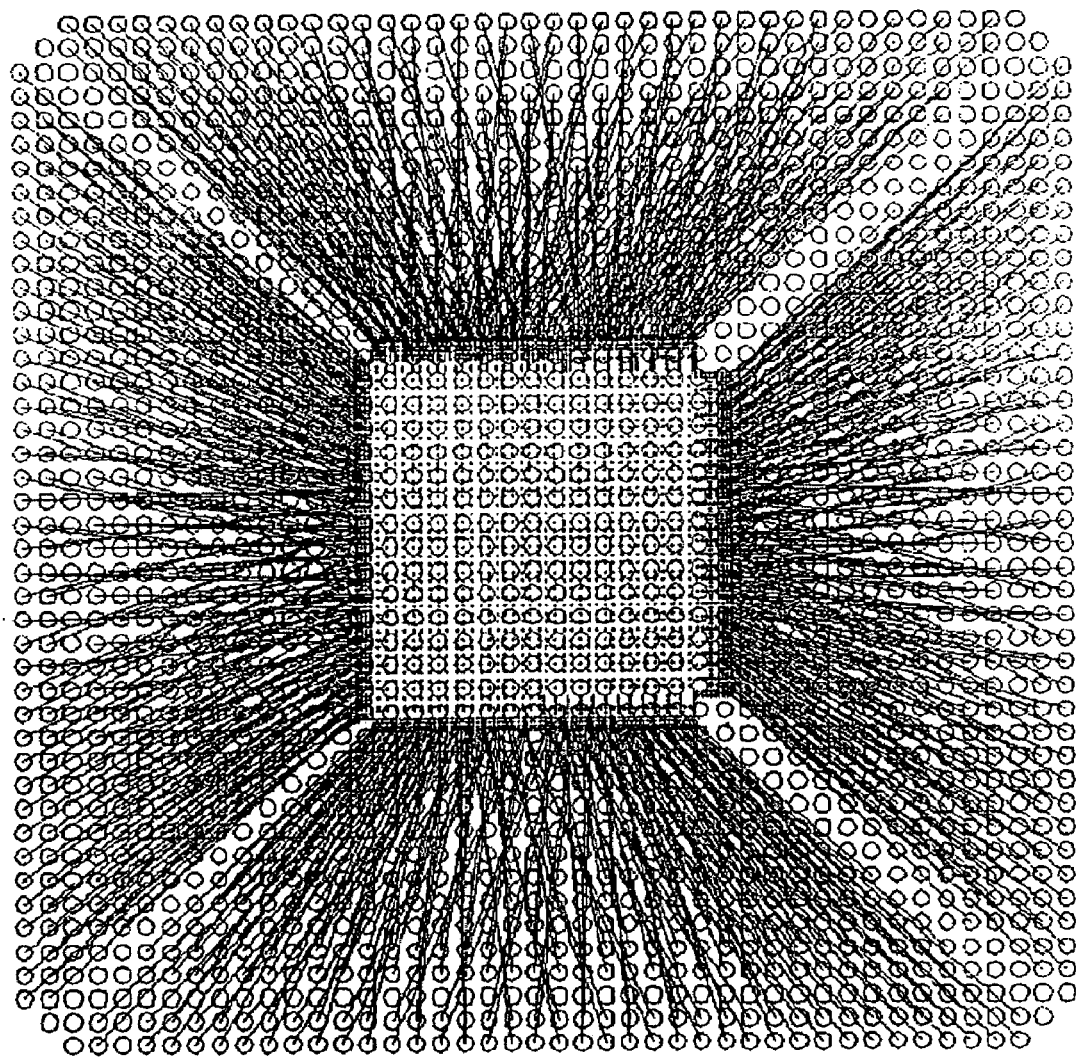

As shown in FIG. 13H, the sets of top side conductors have been mapped to the bottom side conductors within the regions selected by the user, while FIG. 13I shows the line to line connections between the top side and bottom side conductors. FIG. 13J shows a different example of a complex set of logical connections between the top side conductors and the bottom side conductors for a large number of conductors.

Figures 14, 15:
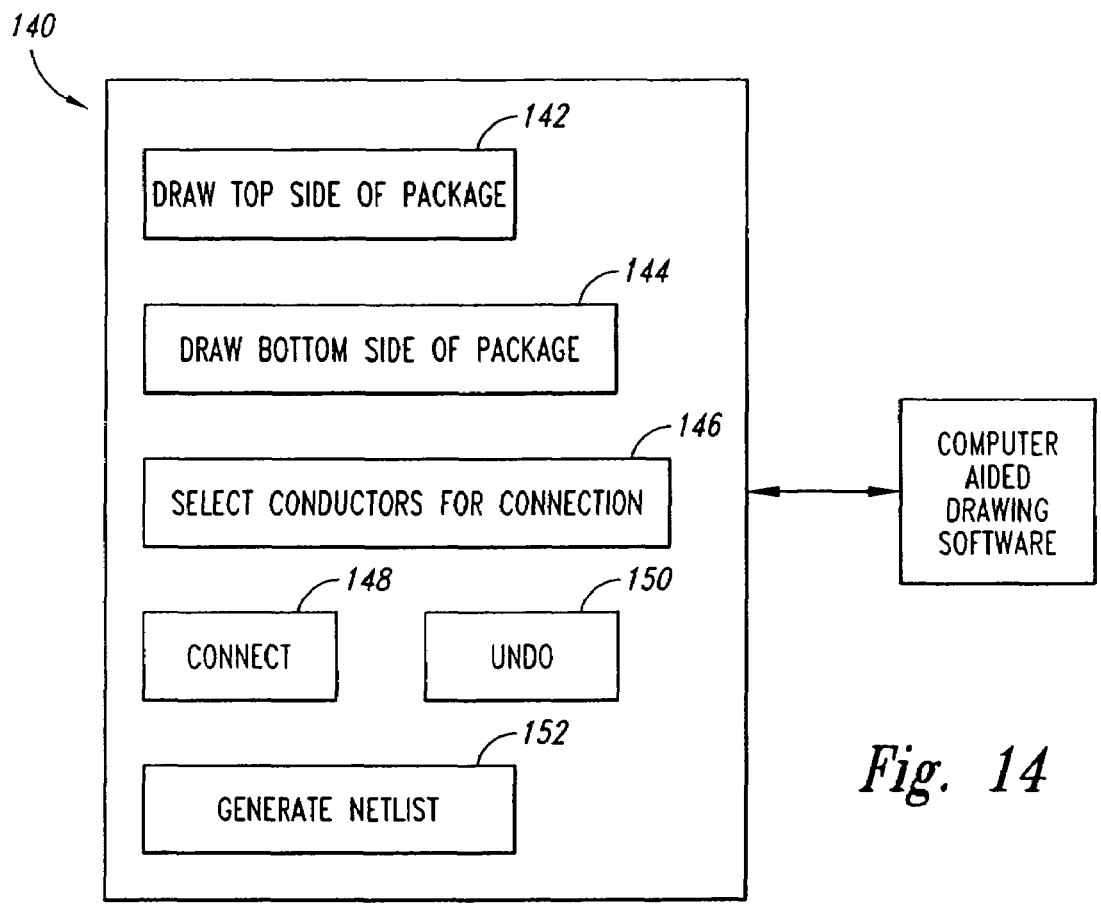
FIG. 14 illustrates a block diagram of a software architecture having various modules to perform the operations described, in accordance with one embodiment of the present invention.
FIG. 15 illustrates one example of a net list generated, in accordance with one embodiment of the present invention.

FIG. 14 illustrates one example of a software architecture, in accordance with one embodiment of the present invention. Front end GUI modules 140 are provided for performing the various functions identified herein, as needed or desired depending on the particular implementation. As shown in FIG. 14, a module 142 is provided for drawing the top side of the package; a module 144 is provided for drawing the bottom side of the package; a module 146 is provided for selecting conductors for connection between the top side and the bottom side; a module 148 is provided for logically connecting the selected conductors; a module 150 is provided for "undo"ing any logical connection made if the user does not like the logical assignment; and a module 152 is provided for generating a net list which specifies the connections between the top side and bottom side conductors. These modules can be implemented, in one embodiment of the present invention, using the various logical operations described herein. Further, these modules can be implemented as graphical user interfaces (GUI) so as to obtain information and input from users through the GUI and display the resulting operations and results thereof to the user through the GUI. As shown in FIG. 14, the front end GUI modules can pass data to and from a computer-aided drawing software package, such as Autodesk's AutoCAD, in order to provide the functionality described herein.

FIG. 15 illustrates one example of a net list 154, and this example is shown in Allegro form. The net list is a data structure or list of relationships between the top side conductors and the bottom side conductors, wherein the relationships are defined as the result of the above described operations. As shown in FIG. 15, the net list can, in one example, logically connect or associate a signal name to top side conductor (and location ID) and to a bottom side conductor. For instance, as shown in one row of FIG. 15, "ANALOG_DIODE_N" is a signal name, while "C4_PAD.D54" is a top side conductor name with a location I.D., and "UO1.A22" is a bottom side conductor name with a location I.D. This net list therefore specifies that the signal "ANALOG_DIODE_N" is connected with top side conductor D54, and is also connected with bottom side conductor "A22." Accordingly, for a single row in the net list, a signal name, top side conductor name, and bottom side conductor name are provided.

Further, in accordance with one embodiment of the present invention, the net list 154 may also identify certain connections as differential pair connections, so that the differential pair signals which are identified will be properly routed according to design rules for the differential pairs. For instance, for an identified differential pair, a design rule may require that the physical routing of the differential pair be no farther apart than 1.27 millimeters. By identifying which signals are differential pairs, the subsequent routing software can properly place the connection according to the design rules for differential pairs. In the example of FIG. 15, a differential pair is identified as ANALOG_DIODE_N and ANALOG_DIODE_P.

Hence it can be seen that, in general, embodiments of the present invention provide initialization of the data describing the top side conductors and the bottom side conductors; provide logical connections between the top side conductors and the bottom side conductors in a manner that is automatic and efficient; and permit iterative changes to the layout as needed by the designers.

While the above described operations have illustrated methods for logically connecting top side conductors 26 with bottom side conductors 28 of an integrated circuit package 22, FIGS. 16–23 relate to automatically routing these connections within a package through a plurality of redistribution layers of the package, in accordance with an embodiment of the present invention. One or more computer program modules may be formed to automatically route in the integrated circuit package the signal lines between the top and bottom conductors, using one or more of the operations described herein.

Figure 16:
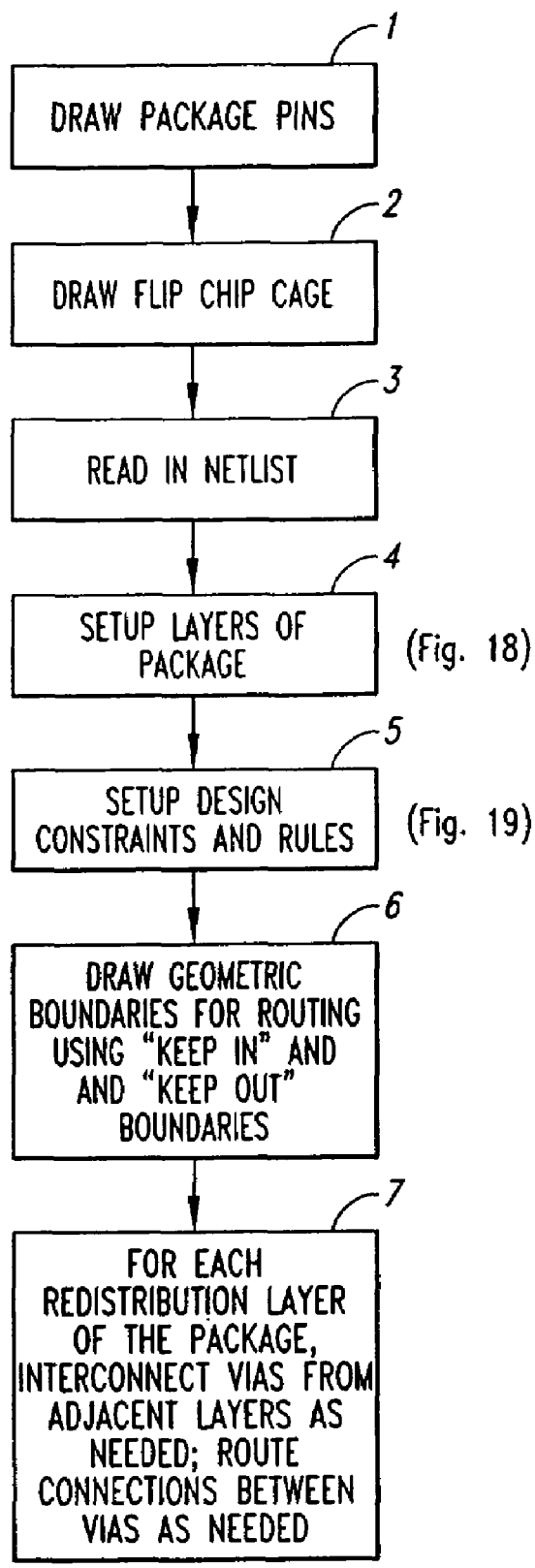
FIG. 16 illustrates one example of the logical operations for automatically routing the logical connections between top side and bottom side conductors of a package, in accordance with one embodiment of the present invention.
Figure 17:
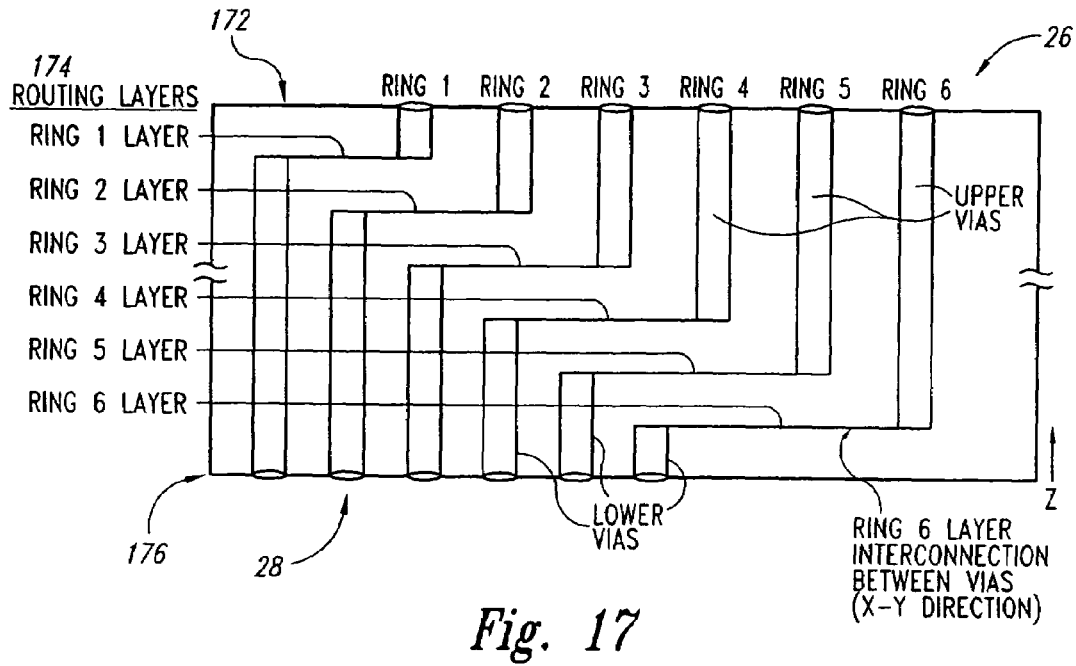
FIG. 17 illustrates an example of a cross-sectional view of a package, having a plurality of routing layers therein for connecting the top side conductors to the bottom side conductors of the package, in accordance with one embodiment of the present invention.
Figure 20:
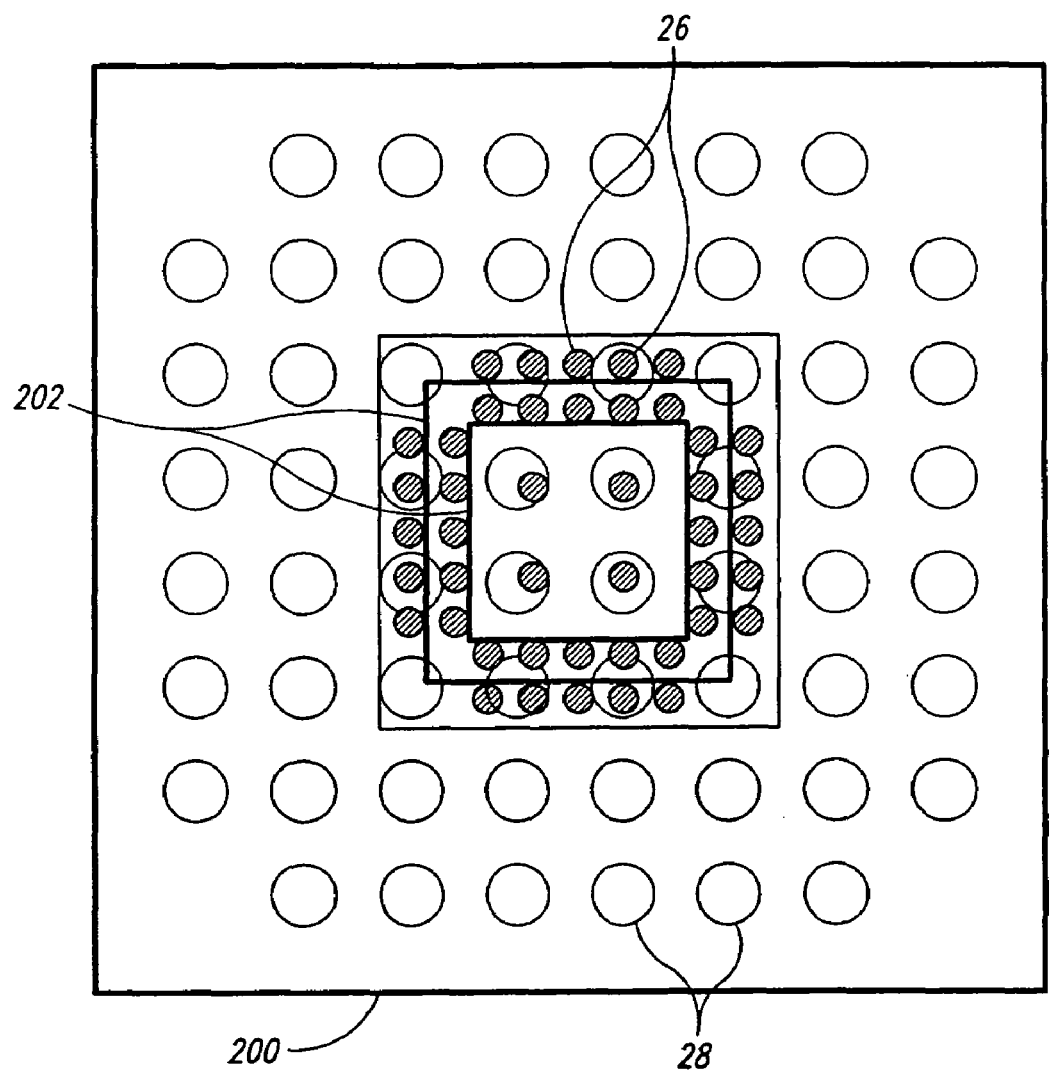
FIG. 20 illustrates an example of a drawing of top side conductors interposed over bottom side conductors, as well as a "keep-in" and "keep-out" boundaries, in accordance with one embodiment of the present invention.
Figure 21:
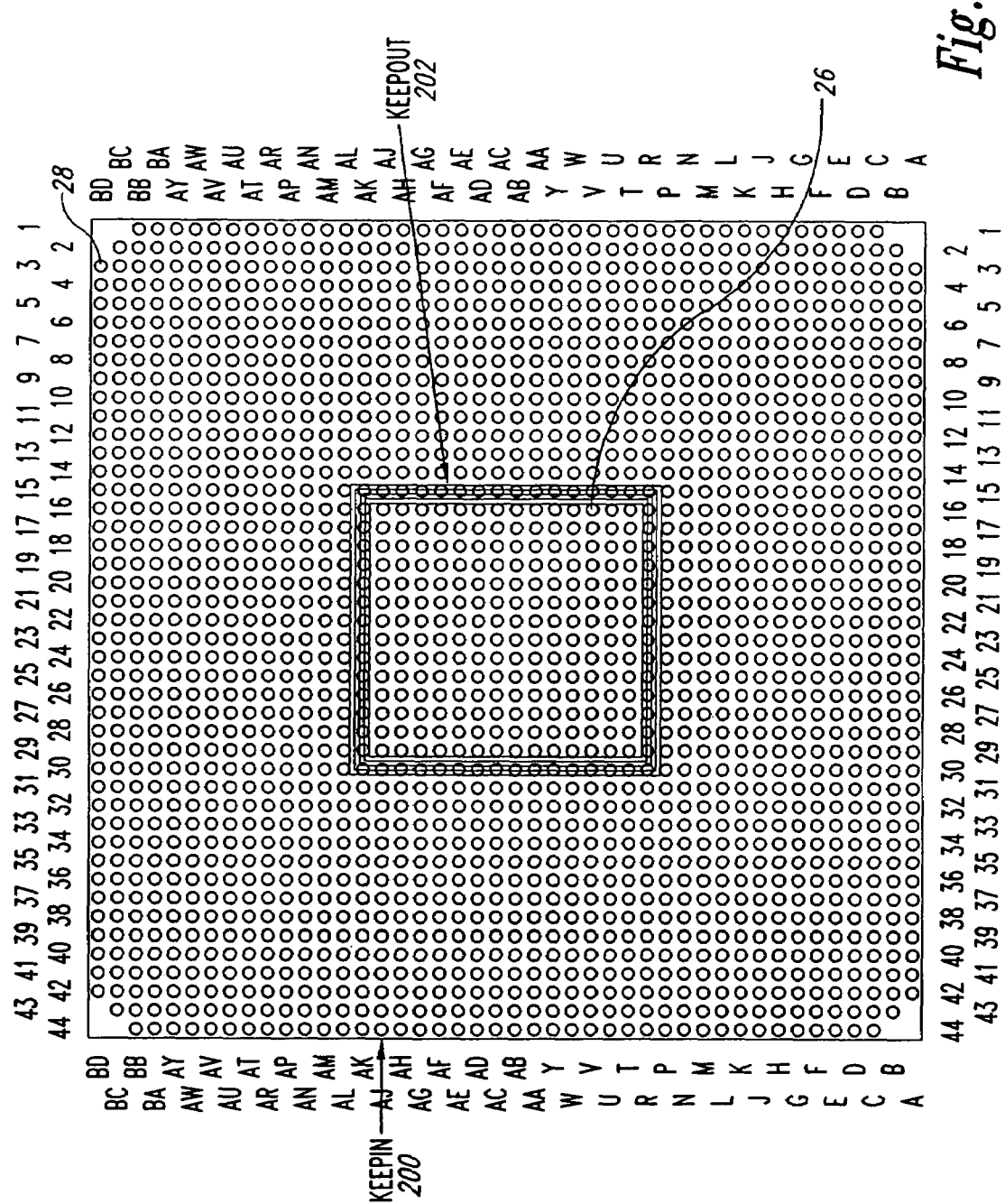
FIG. 21 illustrates another example of top and bottom side conductors drawn, with "keep-in" and "keep-out" boundaries defined therein, in accordance with one embodiment of the present invention.

Referring now to FIG. 16, one example of the logical operations for automatically routing connections is illustrated, in accordance with one embodiment of the present invention. At operation 1, the package pins—including the bottom side conductors 28 of the package—can be drawn in a graphical user interface. This operation is similar to operation 1 of FIG. 2, previously described in one embodiment. At operation 2, the flip chip cage—or the top side conductors 26 of the package—may also be drawn in the graphical user interface. FIGS. 20–21 show examples of drawings showing top and bottom side conductors of a package. At operation 3, the net list or data structure specifying the logical connections between the top and bottom side conductors (such as the net list 154 created by operation 9 of FIG. 2) is read so that the process or computer program module is made aware of the logical connections between the top side conductors and the bottom side conductors of the package.

At operation 4, the layers 170 of the package are defined. In one example, the layers are defined to include a top side metalization layer 172 (corresponding to the top side layer of conductors of the package for receiving the flip chip interconnects of the die), at least one redistribution layer 174 (also referred to herein as a distribution layer or a routing layer) for routing connections or signals on the layer (see FIG. 17 having rings 1–6 and redistribution layers 1–6, and see FIGS. 22A–C having rings 1–3 and redistribution layers 1–3 shown as 174A, B, C), and a bottom side metalization layer 176 (including a bottom side layer of conductors for the pins of the package). In one embodiment, the top side conductors are arranged in rings 178 (shown as 178A, B, C in FIGS. 22A–C), as previously described with reference to operation 3 of FIG. 2, and for each ring 178 of top side conductors of the package, a corresponding redistribution layer 174 is provided within the package for routing the signals, as shown in the examples of FIG. 17 and FIGS. 22A–C.

Figure 18:
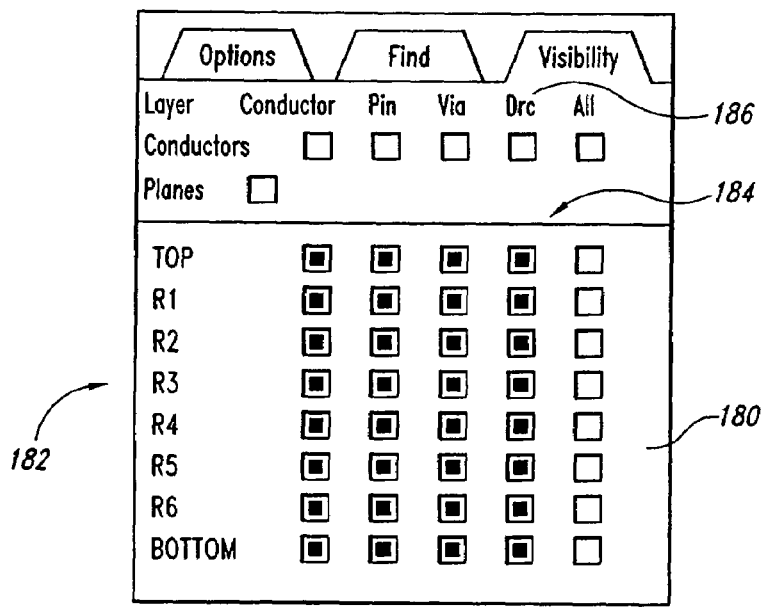
FIG. 18 illustrates an example of a computer display providing an interface for a user to set up the redistribution layers of a package, in accordance with one embodiment of the present invention.

As shown in FIG. 18, a graphical user interface 180 can be used to provide user control of the number, type, and arrangement of the layers. The graphical user interface permits a user to define the number of physical layers for the package, define the layer stackup (i.e., the order of the layers within the package), and the type of layers (i.e., whether layers have pins, vias, etc.). As shown in FIG. 18, a list 182 of the number of layers which the user has defined for the package is shown, and for each layer, a set of user controls 184 can be selected/de-selected so that the user can define whether a particular layer will show conductors, pins, and/or vias or any combination thereof, in one embodiment.

Figure 19:
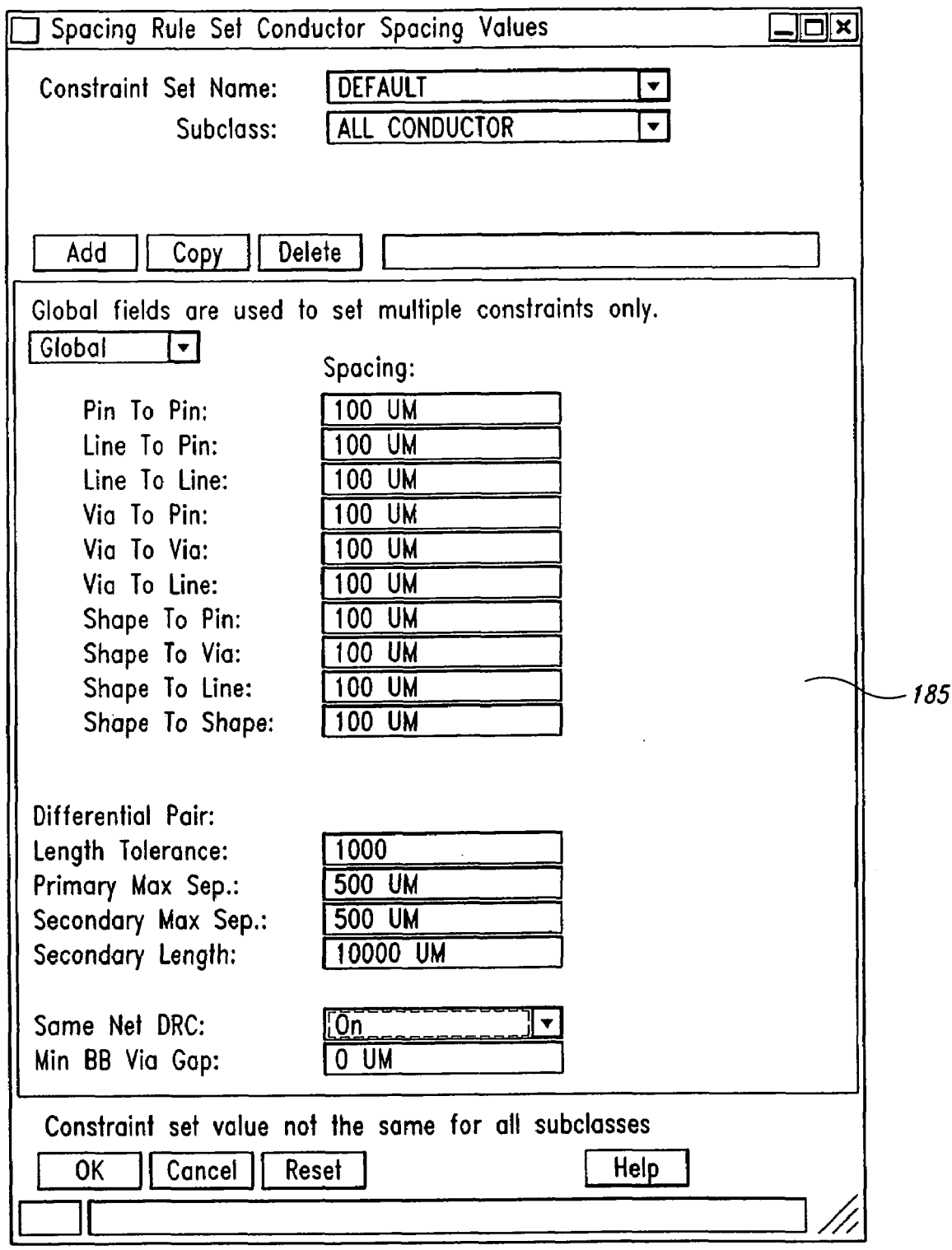
FIG. 19 illustrates an example of a computer interface for permitting a user to define various design rules or constraints for use in signal line routing, in accordance with one embodiment of the present invention.

At operation 5 of FIG. 16, the design constraints and rules for routing of the connections may be defined. In one example and as shown in FIG. 19, a graphical user interface 185 can be utilized to obtain design constraints, line widths, line spacing, constraints for handling differentials pair connections (i.e. specifying the distances between the signal lines of the differential pairs) and other design constraints can be specified by the use, if desired. A DRC (design rule check) control 186 shown in the graphical user interface of FIG. 18 permits a user to enable or disable design rule checking for a particular layer, wherein if enabled, the particular layer will be checked against the design rules established for the package.

At operation 6 of FIG. 16, the geometric boundaries for routing are defined. In one example, boundaries are defined as "keep-in" and "keep-out" boundaries 200, 202 which set the geometric boundaries for which the routing/interconnection of vias is permitted within a particular redistribution layer, in one embodiment. The "keep-in" and "keep-out" boundaries function to define or to permit a user to select (i.e., through user input) a geometric boundary for routing so as to restrict the routing operations to occur within a particular specified boundary. FIG. 20 illustrates an example of top side conductors and bottom side conductors interposed in a graphical display of a computer screen, with "keep-in" and "keep-out" boundaries 200, 202 defined as indicated in this example. FIG. 21 illustrates another example of a "keep-in" boundary and a plurality of "keep-out" boundaries defined for a package having numerous top side conductors and bottom side conductors, in accordance with one embodiment of the present invention.

In one embodiment, one or more keep-out regions may be defined wherein each keep-out region corresponds to a region radially inward of the rings of the top side conductors of the package, for instance as previously defined by operation 3 of FIG. 2. The "keep-out" boundary functions to specify that the routing/interconnecting operation can not cross into the "keep-out" boundary or make any routings inside the "keep-out" boundary. Referring again to FIGS. 20 and 22A–C, in one embodiment, one "keep-out" boundary is defined for every ring of top side conductors so as to force the routing operation to occur in a radially outward direction, as shown in FIGS. 22A–C. By defining the "keep-out" regions in this way, the routing operations therefore must emanate outwardly within the package.

Figure 22A:
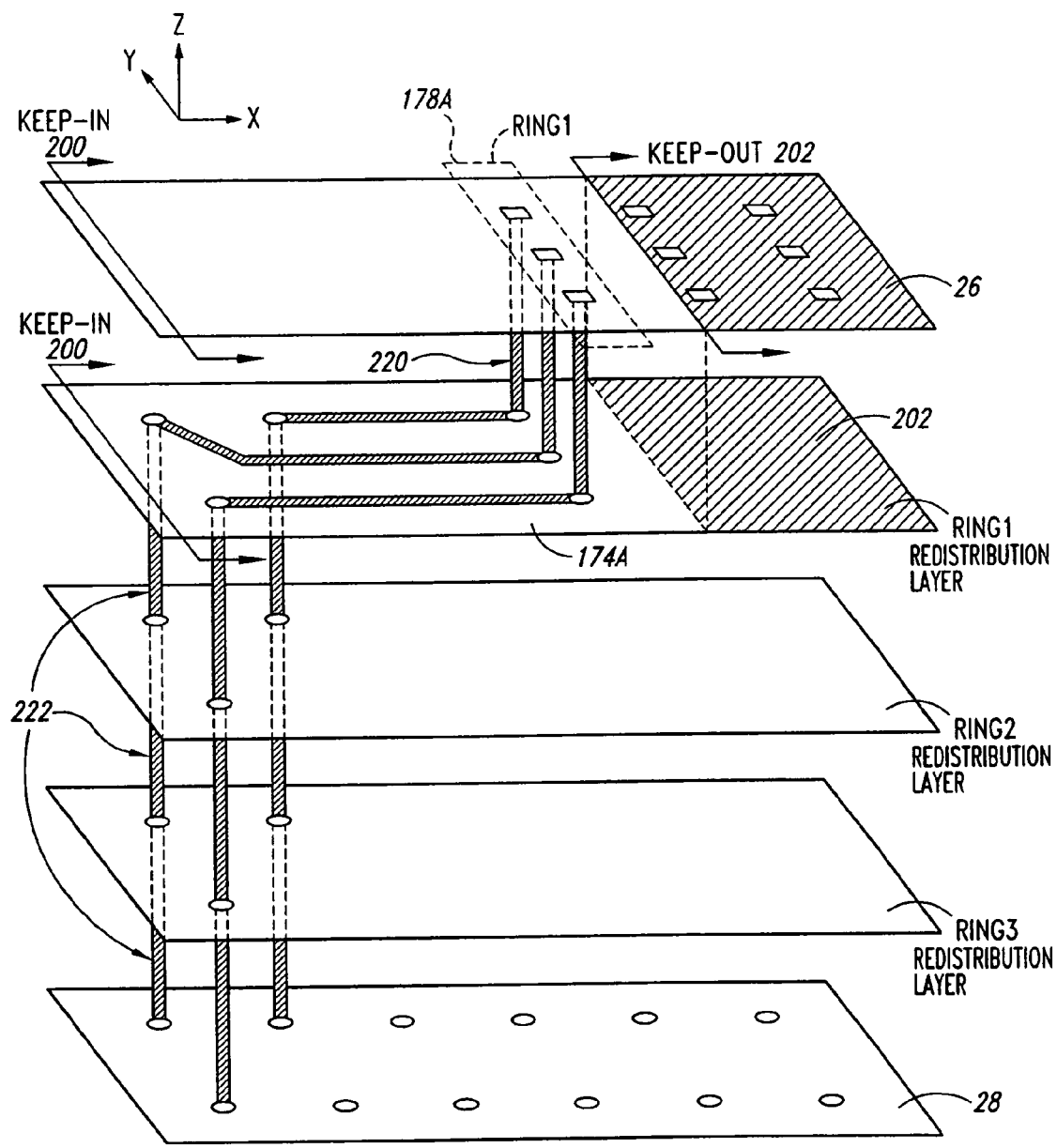
FIGS. 22A–C illustrate a three-dimensional view of an example of a package having a plurality of redistribution layers for routing connections between top and bottom side conductors, in accordance with one embodiment of the present invention.
Figure 22B:
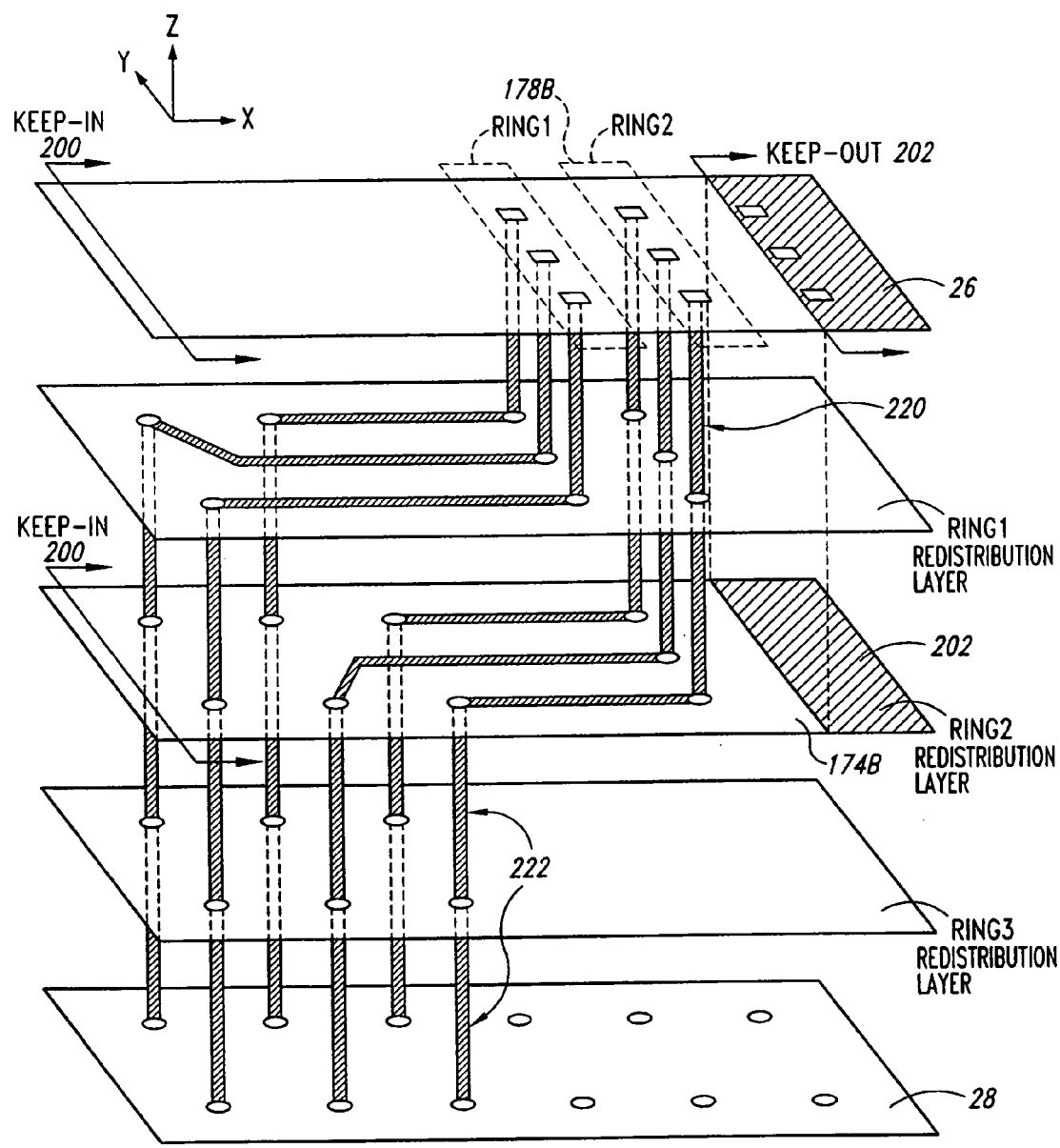
Figure 22C:
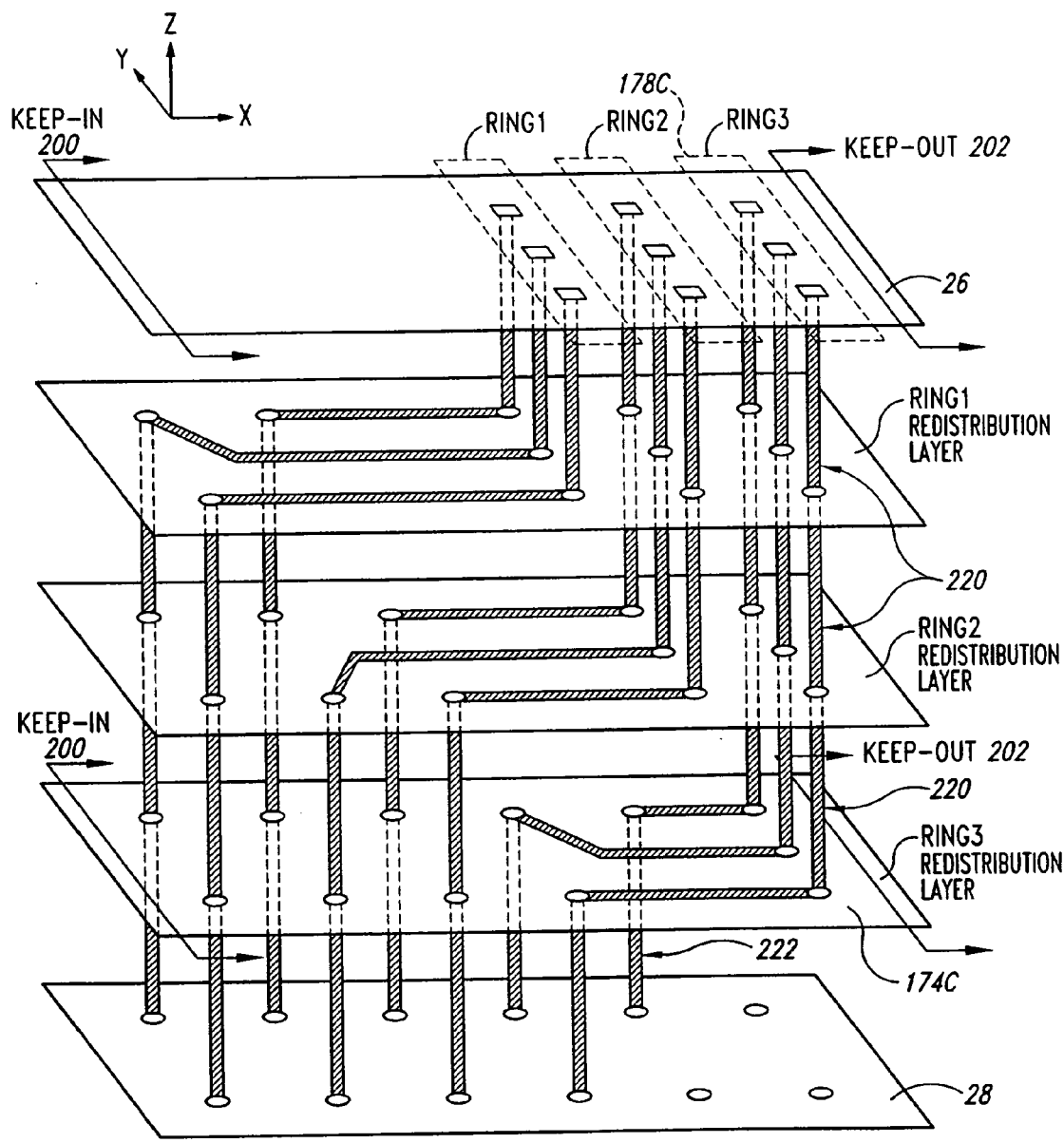

Further, in one embodiment, the sets of top side conductors which are part of the outermost ring(s) are routed first, followed by the next set of conductors in the next ring(s) which are interior to the prior rings(s) but outside of the remaining un-routed rings. This process is illustrated in FIGS. 22A–C, wherein Ring 1 conductors are routed first, followed by Ring 2 conductors, followed by Ring 3 conductors, in one example.

Referring to operation 7 of FIG. 16, for each redistribution layer 174 of the package, the vias are automatically interconnected from vias of adjacent layers as needed. The vias connections on a redistribution layer are made based on, in one embodiment, the top side conductors which are part of the ring or set of conductors for this particular redistribution layer as well as the bottom side conductors have been logically connected with these top side conductors as indicated in the file read at operation 3.

The signals between vias on a particular redistribution layer 174 are routed so as to properly electrically connect the conductors 26, 28. In one embodiment, in operation 7, the net list 154—which contains the data of the logical connections between the top side conductors and bottom side conductor—may be examined in order to determine which routing layers of the package should be utilized in order to make the physical connection between the top side conductor and the bottom side conductors.

As shown in FIGS. 17 and 22A–C, one or more upper vias 220 connect a set of top side conductors 26 with a redistribution layer 174, and one or more lower vias 222 connect a set of bottom side conductors 28 (corresponding to the top side conductors) to the redistribution layer 174. The upper and lower vias 220, 222 may exist across more than one redistribution layer.

In one embodiment, in order to route the signals between vias on a particular redistribution layer, operation 7 may generate a design file (such as, in one example, a SPECTRA™ design file) which specifies how the routing is to be performed for the package using the design rules and constraints specified. The routing on the redistribution layer between the vias may then be accomplished using routing software, such as SPECTRA™ routing software in one example, wherein the routing software is provided with the procedures and design rules to perform the routing on one or more redistribution layers. Some rules may include, for example, the keep-in and keep-our boundaries 200, 202, no via inclusion (if vias were already placed), route using straight and diagonal lines, or other design rules or constraints.

For each corresponding set of top side and bottom side conductors to be physically connected, a route is made along the appropriate routing layer 174 to make the physical connection between the top side conductor 26 and the bottom side conductor 28 for the package while observing the design constraints and rules specified at operation 5, as well as observing the geometric boundaries 200, 202 defined at operation 6. In this manner, a physical interconnection or routing between the top side conductors 26 and the bottom side conductor 28 of an integrated circuit package 22 can be generated while respecting the design rules and constraints, in accordance with an embodiment of the present invention.

FIGS. 22A–C illustrate an example of automatically routing connections between top side conductors and bottom side conductors, in accordance with one embodiment of the present invention. In the example of FIGS. 22A–C, the package has a set of top side conductors 26, and a set of bottom side conductors 28, along with three redistribution layers 174A, B, C shown as "Ring 1 redistribution layer," "Ring 2 redistribution layer," and "Ring 3 redistribution layer." Each redistribution layer 174A, B, C is used to redistribute the conductors corresponding to a defined top side ring or set 178A, B, C of conductors. For example, as shown in FIG. 22A, the Ring 1 redistribution layer 174A is used to redistribute or route the conductors in the set 178A of "Ring 1" conductors so that these conductors are properly routed and connected with the bottom side conductors or pins through the upper and lower vias.

As shown in FIG. 22A, a set of upper vias 220 are connected between the top side conductors 26 and the Ring 1 redistribution layer 174A. On the Ring 1 redistribution layer, these conductors are routed to the appropriate positions on the Ring 1 redistribution layer 174A so that a set of lower vias 222 can connect these conductors to their appropriate and respective bottom side conductors 28. In making this routing, the keep-in and keep-out boundaries 200, 202 are used to define where the routing can take place in the X-Y direction of the redistribution layer 174A. As shown in FIG. 22A, in one embodiment of the invention, the conductors corresponding to the set 178A of conductors in Ring 1 are routed or distributed on the Ring 1 redistribution layer 174A, and the other connections between layers for the Ring 1 conductors are made using vias 220, 222. In this manner, the routing for the Ring 1 conductors is provided for on a single redistribution layer, in one example.

Referring to FIG. 22B, the set 178B of top side conductors for Ring 2 are connected with the Ring 2 redistribution layer 174B using a set of upper vias 220. On the Ring 2 redistribution layer, from the upper vias, these conductors are routed to their appropriate position so that they can be connected with their respective bottom side conductors 28 using a set of lower vias 222, as shown in FIG. 22B. Similarly in FIG. 22C, the set 178C of top side conductors of Ring 3 are connected with the Ring 3 redistribution layer 174C using a set of upper vias 220 and on the Ring 3 redistribution layer 174C, these conductors are routed to their appropriate positions so that they may be connected with the appropriate bottom side conductors 28 through a set of lower vias 222.

It is understood that the examples of FIGS. 22A–C illustrate only a portion of an integrated circuit package, and that embodiments of the present invention may be utilized to route the signals within an integrated circuit package having numerous (i.e., thousands or more) of top side conductors and bottom side conductors, depending upon the particular integrated circuit package design in which the embodiment of the present invention are being utilized to assist in designing.

Figure 23:
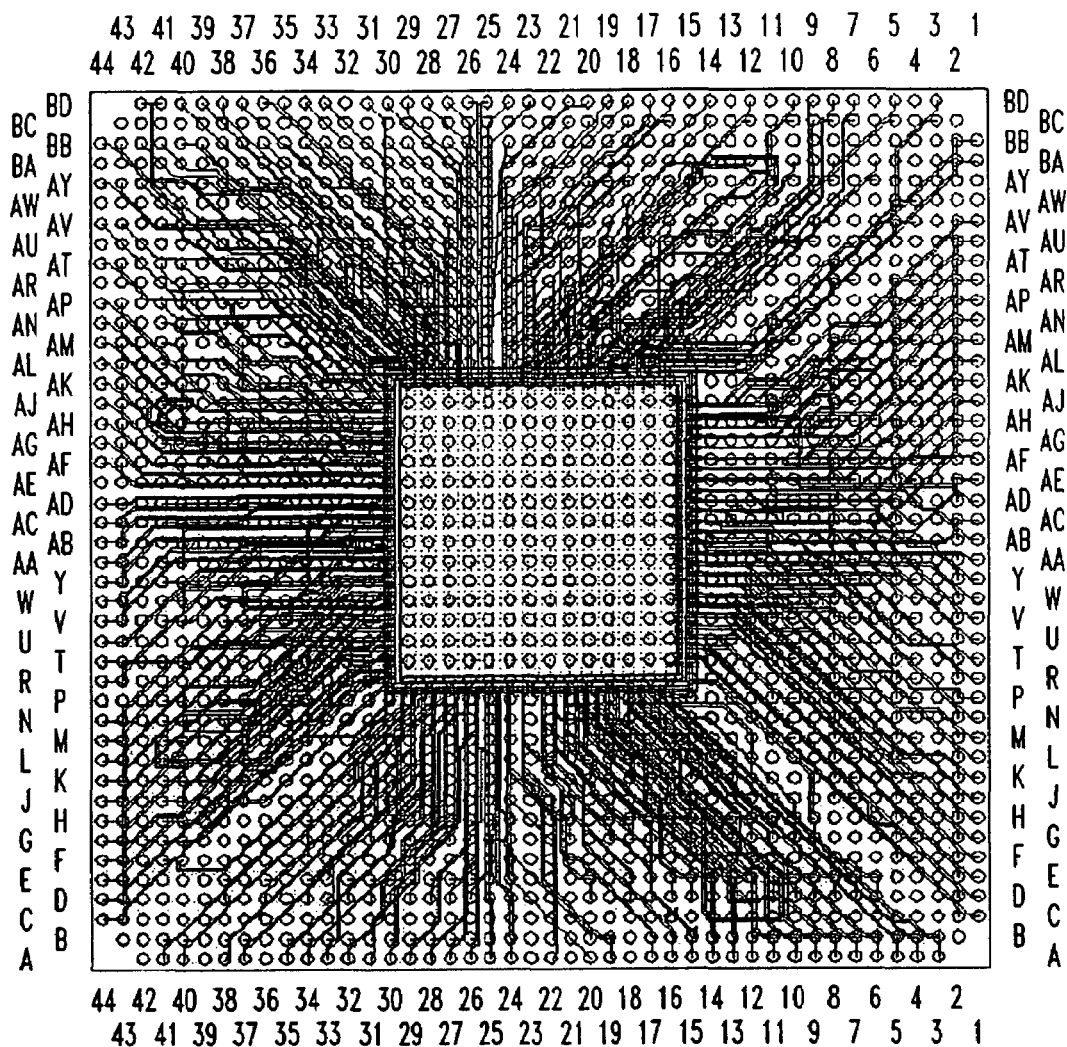
FIG. 23 illustrates an example drawing of a finished route, including all layers of a package for physically connecting the top side conductors with the bottom side conductors of a package, in accordance with one embodiment of the present invention.

Accordingly, it can be seen that embodiments of the present invention provide for the efficient and automatic routing of top side conductors to bottom side conductors through one or more layers within the package. FIG. 23 illustrates an example of a finished route for an integrated circuit package, including all layers of a package having various connections between the top side conductors and the bottom side conductors of the package, in accordance with one embodiment of the present invention.

While particular numbering or labeling schemes have been used to discuss examples of various embodiments of the present invention, it is understood that the particular numbering schemes for the rings, as well as the numbering or labeling schemes for the pins or pads of the package, is a matter of choice and is not intended to be a limitation of the present invention. Further, all directional references (e.g., upper, lower, upward, downward, left, right, leftward, rightward, top, bottom, above, below, vertical, horizontal, clockwise, counterclockwise, etc.) are only used for identification purposes to aid the reader's understanding of the present invention, and do not create limitations, particularly as to the position, orientation, or use of the invention.

The embodiments of the invention described herein are implemented as logical operations in a computing system. The logical operations of the present invention are implemented (1) as a sequence of computing implemented steps running on the computing system and (2) as interconnected machine modules within the computing system. The implementation is a matter of choice dependent on the performance requirements of the computing system implementing the invention. Accordingly, the logical operations making up the embodiments of the invention described herein are referred to variously as operations, steps, or modules.

While the methods disclosed herein have been described and shown with reference to particular operations or steps performed in a particular order, it will be understood that these operations or steps may be combined, sub-divided, or re-ordered to form equivalent methods without departing from the teachings of the present invention. Accordingly, unless specifically indicated herein, the order and grouping of the operations or steps is not a limitation of the present invention.

While the invention has been particularly shown and described with reference to various embodiments thereof, it will be understood by those skilled in the art that various other changes in the form and details may be made without departing from the spirit and scope of the invention.

We claim:

1. In the design of an integrated circuit package having a top side and a bottom side, a method of routing connections in the integrated circuit package, comprising:

defining at least one distribution layer within the package;

positioning a plurality of upper vias between a plurality of conductors on the top side of the package and the distribution layer;

positioning a plurality of lower vias between the distribution layer and a plurality of conductors on the bottom side of the package that correspond to the plurality of conductors on the top side of the package; and routing one or more connections on the distribution layer between the plurality of upper vias and the plurality of lower vias, thereby connecting one or more conductors on the top side of the package to their respective one or more conductors on the bottom side of the package.

2. The method of claim 1, wherein the plurality of conductors on the top side of the package contains at least a single row of top side conductors.

3. The method of claim 1, further comprising:

specifying one or more design constraints, wherein said routing operation is based on the one or more design constraints.

4. The method of claim 3, wherein the specifying operation further comprises:

providing a user interface to define a region on the distribution layer where the routing operation takes place.

5. The method of claim 1, further comprising reading a file specifying a set of logical connections between a plurality of conductors on the top side of the package and a plurality of conductors on the bottom side of the package.

6. The method of claim 5, wherein the file defines at least one pair of differential signals having a spatial relationship therebetween; and wherein said routing operation maintains the spatial relationship between the at least one pair of differential signals.

7. The method of claim 1, wherein the positioning operation of the vias is automatic.

8. The method of claim 1, wherein the routing operation is automatic.

9. A computer program product comprising:

a computer usable medium and computer readable code embodied on said computer usable medium for routing connections in an integrated circuit package having a top side and a bottom side, the computer readable code comprising:

computer readable program code devices configured to cause the computer to effect a defining of at least one distribution layer within the package;

computer readable program code devices configured to cause the computer to effect a positioning a plurality of upper vias between a plurality of conductors on the top side of the package and the distribution layer;

computer readable program code devices configured to cause the computer to effect a positioning a plurality of lower vias between the distribution layer and the plurality of conductors on the bottom side of the package that correspond to the plurality of conductors on the top side of the package; and computer readable program code devices configured to cause the computer to effect a routing one or more connections on the distribution layer between the plurality of upper vias and the plurality of lower vias, thereby connecting one or more conductors on the top side of the package to their respective one or more conductors on the bottom side of the package.

10. The computer program product of claim 9, further comprising:

computer readable program code devices configured to cause the computer to effect a specifying of one or more design constraints, wherein said routing operation is based on the one or more design constraints.

11. The computer program product of claim 10, further comprising:

computer readable program code devices configured to cause the computer to effect a user interface for defining a region on the distribution layer where the routing operation takes place.

12. The computer program product of claim 9, further comprising:

computer readable program code devices configured to cause the computer to effect an automatic positioning operation of the vias.

13. The computer program product of claim 9, further comprising:

computer readable program code devices configured to cause the computer to effect reading of a file specifying a set of logical connections between a plurality of conductors on the top side of the package and a plurality of conductors on the bottom side of the package.

* * * * *